US012559012B2

(12) United States Patent
  Tanaka et al.

(10) Patent No.: US 12,559,012 B2
(45) Date of Patent: Feb. 24, 2026

(54) CONVEYANCE SEAT

(71) Applicant: TS TECH CO., LTD., Asaka (JP)

(72) Inventors: Soichiro Tanaka, Tochigi (JP);
    Haruhiko Kawada, Tochigi (JP);
    Hayato Shimazaki, Tochigi (JP);
    Koichi Suemitsu, Tochigi (JP); **Hiroshi
    Takanohashi, Tochigi (JP); Kyoji
    Uesugi, Tochigi (JP); Daisuke Ogino**,
    Tochigi (JP); Takahiro Inaba, Tochigi
    (JP)

(73) Assignee: TS TECH CO., LTD., Asaka (JP)

( * ) Notice: Subject to any disclaimer, the term of this
    patent is extended or adjusted under 35
    U.S.C. 154(b) by 70 days.

(21) Appl. No.: 18/695,211

(22) PCT Filed: Sep. 27, 2022

(86) PCT No.: PCT/JP2022/036031
    § 371 (c)(1),
    (2) Date: Mar. 25, 2024

(87) PCT Pub. No.: WO2023/054404
    PCT Pub. Date: Apr. 6, 2023

(65) Prior Publication Data
    US 2024/0391372 A1    Nov. 28, 2024

Related U.S. Application Data

(60) Provisional application No. 63/249,714, filed on Sep.
    29, 2021, provisional application No. 63/261,751,
    (Continued)

(30) Foreign Application Priority Data

Feb. 14, 2022    (JP) ................................. 2022-020703
Apr. 15, 2022    (JP) ................................. 2022-067753

(51) Int. Cl.
    *B60N 2/90* (2018.01)

(52) U.S. Cl.
    CPC ..................................... *B60N 2/90* (2018.02)

(58) Field of Classification Search
    CPC ...... B60N 2/90; B60N 2/0033; B60N 2/0264;
                          B60N 2/5825; B60N 2/7017
    See application file for complete search history.

(56) References Cited

U.S. PATENT DOCUMENTS

2012/0219583 A1    8/2012    Nabel et al.
2022/0219583 A1    7/2022    Hayashi et al.

FOREIGN PATENT DOCUMENTS

JP        58020527 A      2/1983
JP      2006321304 A     11/2006
            (Continued)

OTHER PUBLICATIONS

International Search Report (with English translation) received in
corresponding Application No. PCT/JP2022/036031, dated Dec. 6,
2022, 4 pages.
Japanese Office Action (w/English translation) for corresponding
Application No. 2022-020703, dated Nov. 25, 2025, 8 pages.

*Primary Examiner* — Valentina Xavier
(74) *Attorney, Agent, or Firm* — Dority & Manning, P.A.

(57) ABSTRACT

A conveyance seat includes therein a pad material and a
connecting member for connecting electrical devices. The
pad material includes a first pad material and a second pad
material which is provided on a back surface side of the first
pad material and is disposed to overlap the first pad material.
A front surface of the second pad material is provided with
an accommodation groove which is provided to be recessed
in a thickness direction of the pad material and accommo-
dates the connecting member. The accommodation groove
extends to be long along the surface of the second pad
material. The accommodation groove includes a latching
(Continued)

portion which is provided at a predetermined position in an extension direction, protrudes from one side portion toward the other side portion of the accommodation groove, and latches the connecting member.

9 Claims, 29 Drawing Sheets

Related U.S. Application Data filed on Sep. 28, 2021, provisional application No. 63/261,754, filed on Sep. 28, 2021.

(56)                    References Cited

FOREIGN PATENT DOCUMENTS

| JP | 2013111113 | A | | 6/2013 |
|----|------------|---|---|--------|
| JP | 2013126796 | A | | 6/2013 |
| JP | 2018158096 | A | | 10/2018 |
| JP | 2019038291 | A | * | 3/2019 |
| JP | 2019059339 | A | | 4/2019 |
| JP | 2019099099 | A | | 6/2019 |
| JP | 2020203588 | A | | 12/2020 |
| JP | 2021041011 | A | | 3/2021 |
| JP | 2021109606 | A | | 8/2021 |
| JP | 2024015448 | A | * | 2/2024 |
| WO | WO2019111842 | A1 | | 6/2019 |

* cited by examiner

SB 203
(SBh)

201
(SBh)

TB

218

202
(SBh)  250  TB 283
(280)

282
(280)

281
(280)

205

205a

272

270  271

UP

RIGHT        REAR

FRONT        LEFT

DOWN

CONVEYANCE SEAT

CROSS-REFERENCE TO RELATED APPLICATIONS

This application is the U.S. National Stage entry of International Application No. PCT/JP2022/036031, filed on Sep. 27, 2022, which, in turn, claims priority to U.S. Provisional Patent Application No. 63/261,751, filed on Sep. 28, 2021; U.S. Provisional Patent Application No. 63/261, 754, filed on Sep. 28, 2021; U.S. Provisional Patent Application No. 63/249,714, filed on Sep. 29, 2021; Japanese Patent Application No. 2022-020703, filed on Feb. 14, 2022; and Japanese Patent Application No. 2022-067753, filed on Apr. 14, 2022, all of which are hereby incorporated herein by reference in their entireties for all purposes.

TECHNICAL FIELD

The present invention relates to a conveyance seat and particularly to a conveyance seat provided with a connecting member provided inside the conveyance seat to connect electrical devices.

BACKGROUND ART

Conventionally, among conveyance seats provided with seat cushions, there is known a conveyance seat provided with a connecting member (for example, wire harness) provided inside a seat cushion to connect electrical devices (for example, see PATENT LITERATURE 1).

The conveyance seat described in PATENT LITERATURE 1 includes a seat cushion which is constructed by vertically stacking a first pad material and a second pad material formed to be harder than the first pad material.

Then, a back surface of the second pad material is provided with an accommodation groove (guide groove) for accommodating a harness connecting electrical devices (electrical components).

CITATION LIST

Patent Literature

PATENT LITERATURE 1: JP 2018-158096 A

SUMMARY OF INVENTION

Technical Problem

Incidentally, in the conveyance seat described in PATENT LITERATURE 1, it has been required to suitably hold the harness for connecting electrical devices and the like inside the seat.

For example, when the harness is accommodated in the accommodation groove formed on the surface of the pad material, it has been required to suppress the harness from unintentionally coming off from the accommodation groove or from shifting its position within the accommodation groove.

Further, when a seat body (seat cushion) includes two different pad materials, it has been required to appropriately hold the harness while ensuring a seating feeling of a seated person when accommodating the harness in the accommodation groove formed on the surface of the pad material.

The present invention has been made in view of the above-described problems and an object of the present invention is to provide a conveyance seat capable of appropriately holding a connecting member connecting electrical devices and the like inside a seat body compared to the related art.

Further, another object of the present invention is to provide a conveyance seat capable of appropriately holding a connecting member while ensuring a seating feeling.

Solution to Problem

The above-described problems are solved by a conveyance seat of the present invention that is a conveyance seat provided with a pad material including: a connecting member that is provided inside the conveyance seat to connect electrical devices, in which the pad material includes a first pad material and a second pad material which is provided on a back surface side of the first pad material and is disposed to overlap the first pad material, in which a front or back surface of at least one pad material of the first pad material and the second pad material is provided with an accommodation groove provided to be recessed in a thickness direction of the pad material and accommodating the connecting member, and in which the accommodation groove extends to be long along the surface of the at least one pad material and includes a latching portion provided at a predetermined position of the accommodation groove in an extension direction, protrudes from one side portion toward the other side portion of the accommodation groove, and latches the connecting member in order to accommodate the connecting member.

With the above-described configuration, it is possible to realize the conveyance seat capable of appropriately holding the connecting member connecting electrical devices inside the seat body compared to the related art.

Specifically, the accommodation groove formed on the surface of the pad material includes the latching portion which protrudes from one side portion toward the other side portion of the accommodation groove and latches the connecting member. Therefore, it is possible to suppress the connecting member from coming off unintentionally from the accommodation groove or shifting its position within the accommodation groove.

At this time, a part of a bottom surface of the accommodation groove may be provided with a concave portion which is recessed in the thickness direction of the pad material or a through-hole which penetrates in the thickness direction of the pad material, and the latching portion may be provided at a position corresponding to the concave portion or the through-hole in the extension direction of the accommodation groove and latch the connecting member to be covered.

Further, the concave portion or the through-hole may be formed to project from the accommodation groove toward the other side portion side of the accommodation groove, a portion formed on the bottom surface of the accommodation groove in the concave portion or the through-hole may be positioned to face the latching portion, and a portion that projects from the accommodation groove in the concave portion or the through-hole may be positioned not to face the latching portion.

Further, a portion formed on the bottom surface of the accommodation groove in the concave portion or the through-hole may extend to the outer positions of both ends of the latching portion in the extension direction of the accommodation groove.

With the above-described configuration, the connecting member can be easily assembled to the latching portion formed in the accommodation groove with a simple structure. Specifically, a guide portion (concave portion or through-hole) for assembling the connecting member is formed around the latching portion. Therefore, a structure is obtained in which the connecting member can be easily assembled.

Further, with the above-described configuration, since the latching portion latches the connecting member to be covered, it is possible to further suppress the connecting member from coming off unintentionally from the accommodation groove.

At this time, the second pad material may be formed to be harder than the first pad material, and the accommodation groove may be formed on the front surface of the second pad material and may be provided to face the back surface of the first pad material.

With the above-described configuration, a conveyance seat capable of appropriately holding the connecting member while ensuring a seating feeling is obtained.

Specifically, since the connecting member is attached to the second pad material (the pad material on the side of the conveyance) rather than the first pad material (the pad material on the side of the seated person), the seating feeling of the seated person can be ensured. Further, since the connecting member is attached to the front surface of the second pad material harder than the first pad material, the connecting member can be appropriately held by the second pad material with high hardness.

At this time, the conveyance seat may further include a detection sensor which detects biological signals of a seated person, the front surface of the second pad material may be provided with the accommodation groove and a sensor accommodation portion for accommodating the detection sensor, one end of the connecting member may be connected to the detection sensor, and the other end of the connecting member may be exposed from the second pad material and be connected to the electrical device side.

With the above-described configuration, in the seat body including two pad materials with different hardness, the sensing sensitivity of the detection sensor can be increased while ensuring the seating feeling of the seated person.

Specifically, since the detection sensor is disposed on the front surface of the second pad material with high hardness, the detection sensor can appropriately detect biological signals of the seated person.

At this time, the accommodation groove and the sensor accommodation portion may be continuously formed on the front surface of the second pad material, a plurality of the sensor accommodation portions may be formed at intervals in a seat width direction, the accommodation groove may include a groove body portion which extends to be long in the seat width direction and a plurality of groove extension portions which are formed at intervals in the seat width direction and respectively extend in a front to rear direction of the seat to connect the groove body portion and the sensor accommodation portion, and a plurality of the latching portions may be formed at intervals in the seat width direction and be arranged between the plurality of sensor accommodation portions in the seat width direction.

Since the plurality of latching portions are provided as described above, the connecting member and the detection sensor can be appropriately held.

At this time, the groove body portion may extend to one end of the second pad material in the seat width direction, and the other end of the connecting member may be exposed from the one end of the second pad material and be connected to the electrical device side.

As described above, since the connecting member is stretched in the seat width direction to be exposed from one end in the seat width direction inside the seat body, a simple arrangement pattern can be obtained while suppressing the interference between the connecting member and other components.

At this time, the conveyance seat may further include a wire member that holds the second pad material and the second pad material may be made of foamed resin and be formed by insert-molding the wire member.

With the above-described configuration, the rigidity of the second pad material can be improved. Further, the wire member can be firmly held by the second pad material.

At this time, the second pad material may be made of foamed polypropylene, and the first pad material may be made of urethane foam and be disposed on the second pad material.

As described above, since the first pad material close to the seated person in the pad material is made of urethane foam, the comfort of the conveyance seat can be improved.

Advantageous Effects of Invention

According to the present invention, it is possible to realize the conveyance seat capable of appropriately holding the connecting member connecting electrical devices inside the seat body compared to the related art. That is, it is possible to suppress the connecting member from coming off unintentionally from the accommodation groove or shifting its position within the accommodation groove.

Further, according to the present invention, the connecting member can be easily assembled to the latching portion formed in the accommodation groove with a simple structure.

Further, according to the present invention, the connecting member can be appropriately held while ensuring a seating feeling.

Further, according to the present invention, the sensing sensitivity of the detection sensor can be increased by appropriately holding the connecting member and the detection sensor.

Further, according to the present invention, a simple arrangement pattern can be obtained while suppressing the interference between the connecting member and other components.

Further, according to the present invention, the rigidity of the second pad material can be improved. Further, the wire member can be firmly held by the second pad material.

DESCRIPTION OF EMBODIMENTS

First Embodiment

Hereinafter, a first embodiment according to the present invention will be described with reference to FIGS. 1 to 7.

This embodiment is the invention of a conveyance seat having a main feature that a connecting member is provided inside a seat body to connect electrical devices, a pad material of the seat body includes a first pad material and a second pad material, a front surface of the second pad material is provided with an accommodation groove for accommodating the connecting member, and the accommodation groove includes a latching portion which extends from one side portion toward the other side portion of the accommodation groove and latches the connecting member in order to accommodate the connecting member.

Furthermore, the seat back of the conveyance seat on which the seated person is seated is the front side of the seat.

Figure 1:
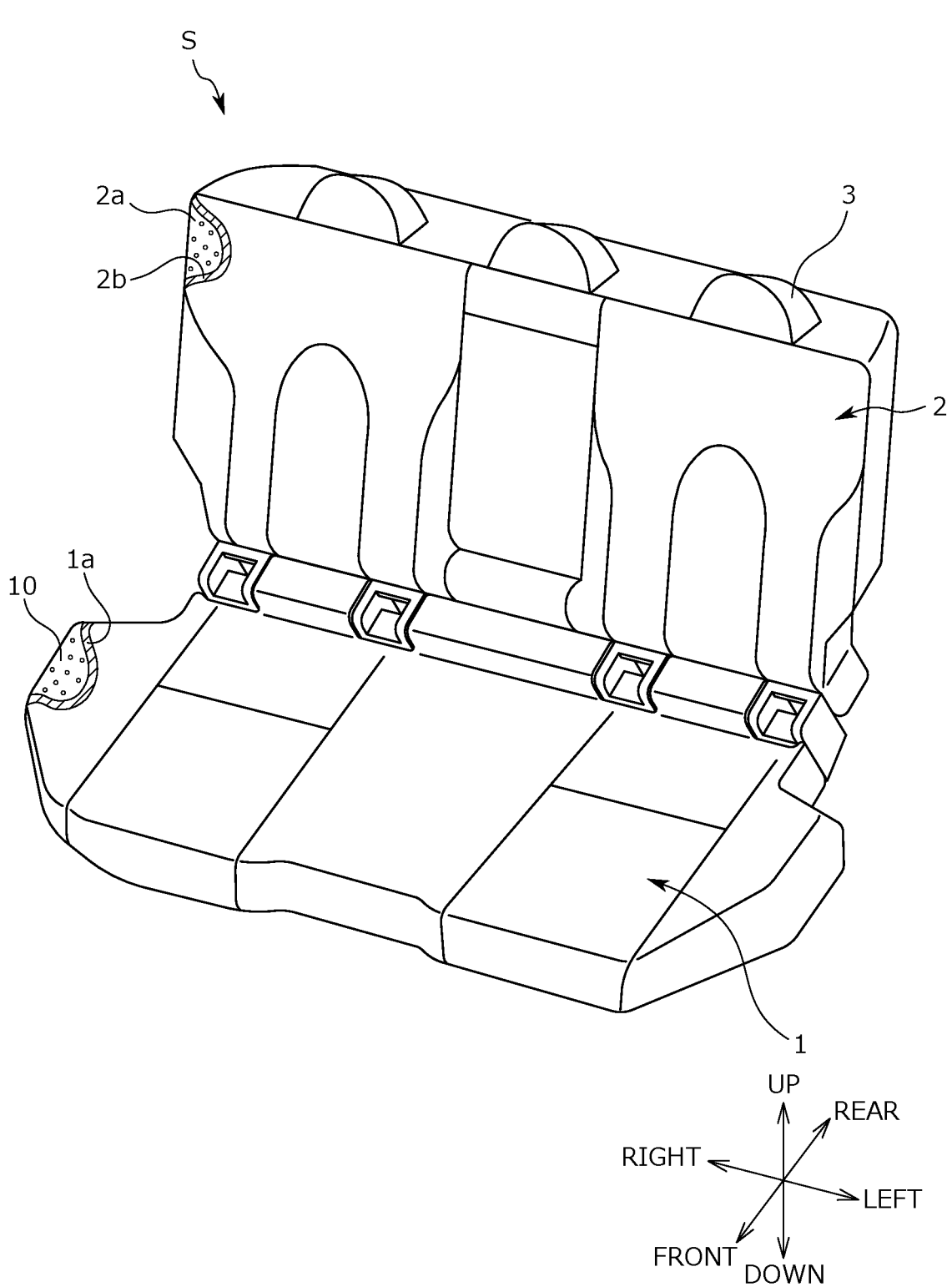
FIG. 1 is an external perspective view of a conveyance seat according to a first embodiment of the present invention.

As shown in FIG. 1, a conveyance seat S of this embodiment is a vehicle seat and is, for example, a vehicle rear seat corresponding to a rear seat of an automobile.

Figure 4:
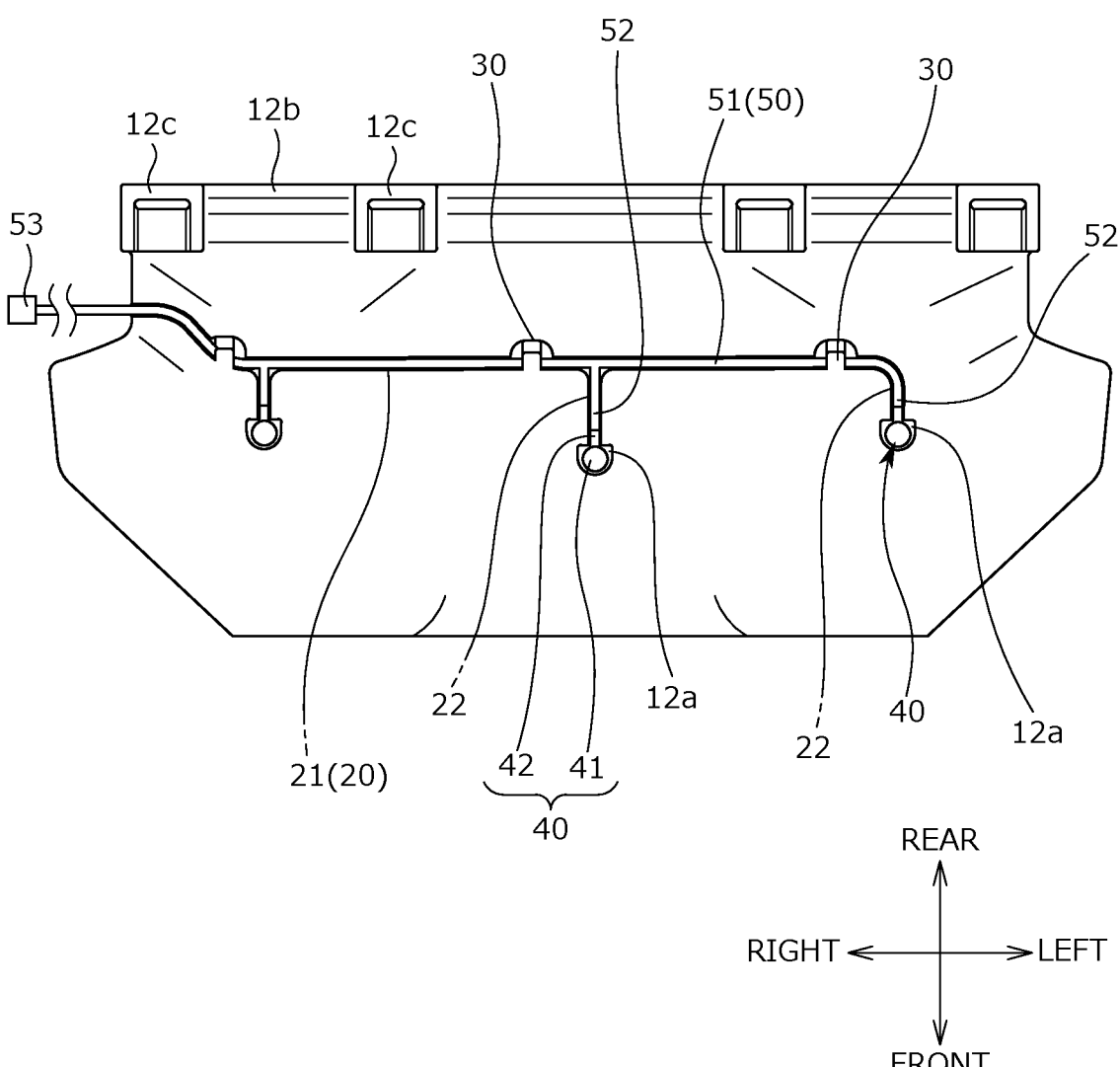
FIG. 4 is a front view of the second pad, a detection sensor, and a connecting member.
Figure 7:
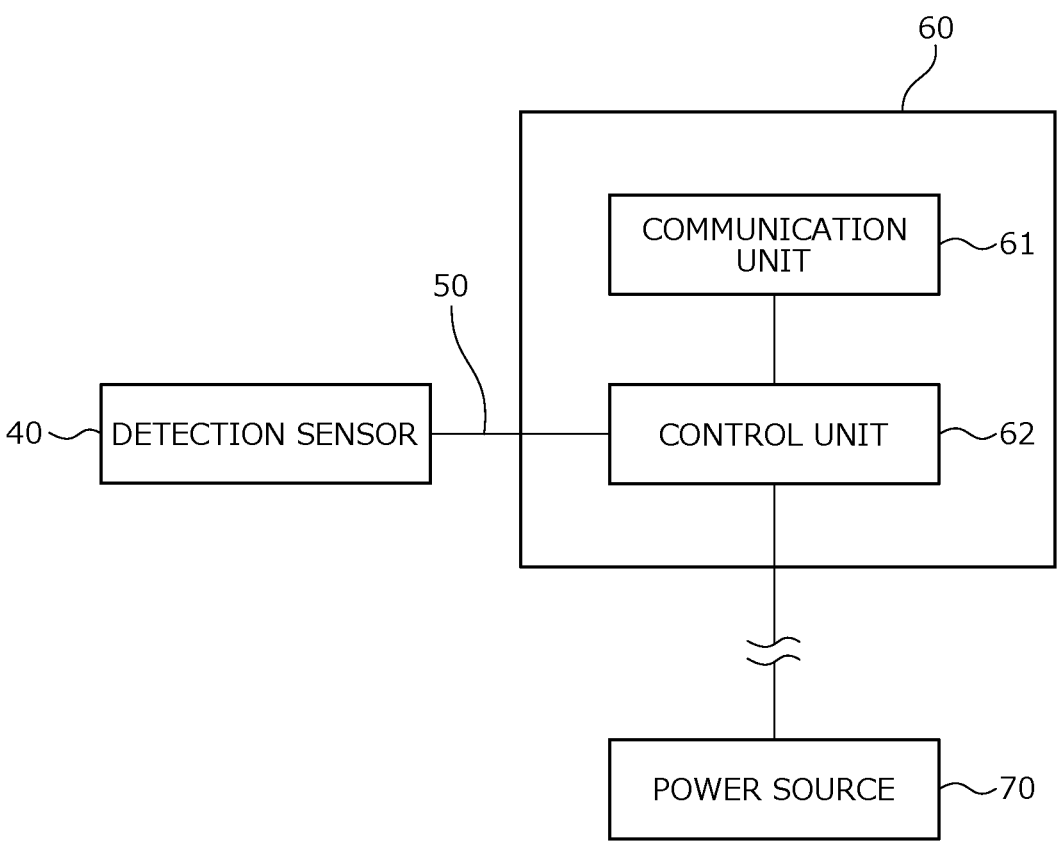
FIG. 7 is a block diagram of a detection sensor, a control device, and a power source.

As shown in FIGS. 1, 4, and 7, the conveyance seat S mainly includes a seat body which includes a seat cushion 1, a seat back 2, and a headrest 3, a sheet-shaped detection sensor 40 which is attached inside the seat body and detects whether a seated person is seated on the seat, a connecting member 50 that is electrically connected to the detection sensor 40, and a control device 60 which receives a signal detected by the detection sensor 40 via the connecting member 50 and performs a process on the basis of the signal.

Figure 2:
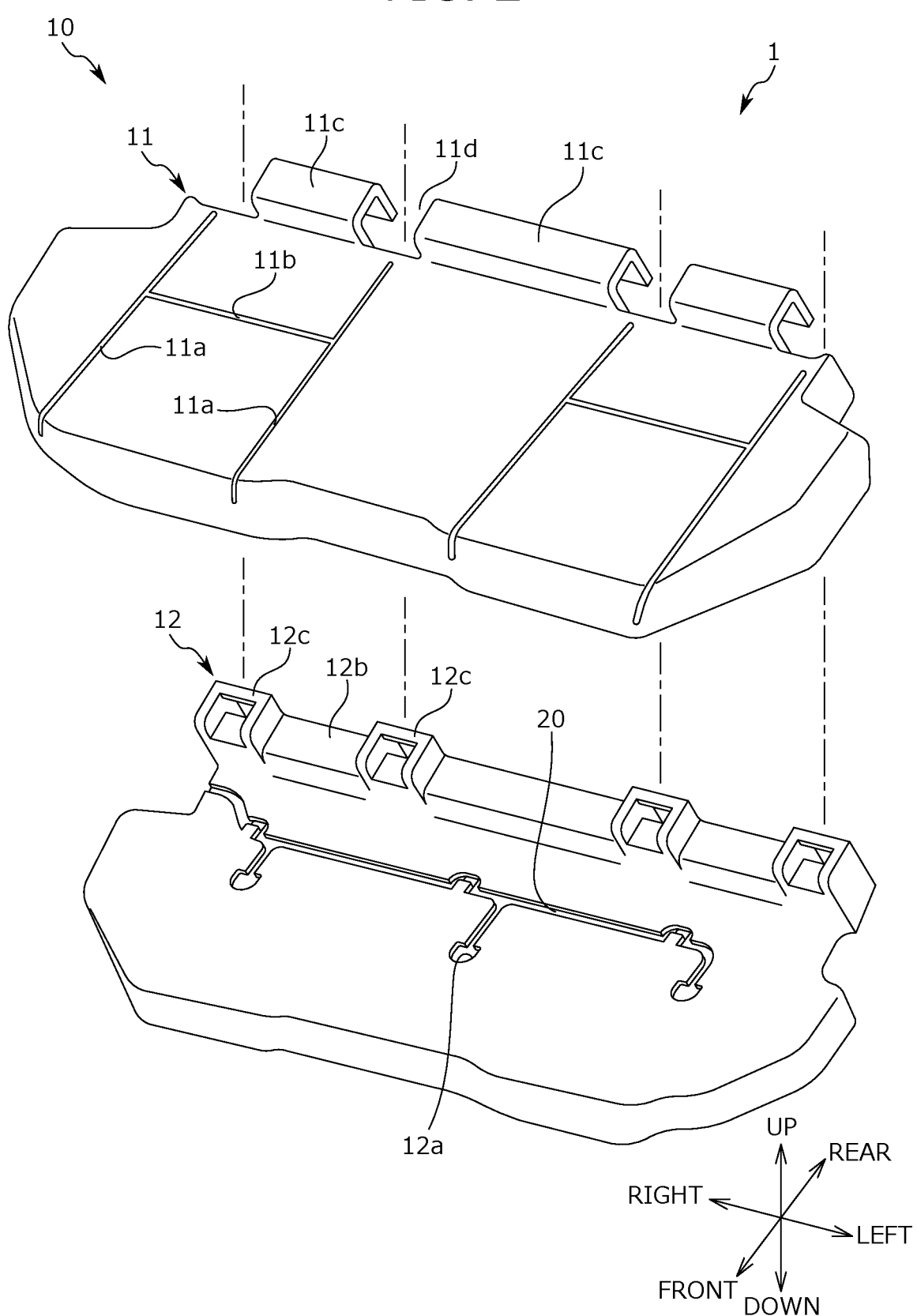
FIG. 2 is an exploded perspective view of a pad material (a first pad material and a second pad material) of a seat cushion.
Figure 3:
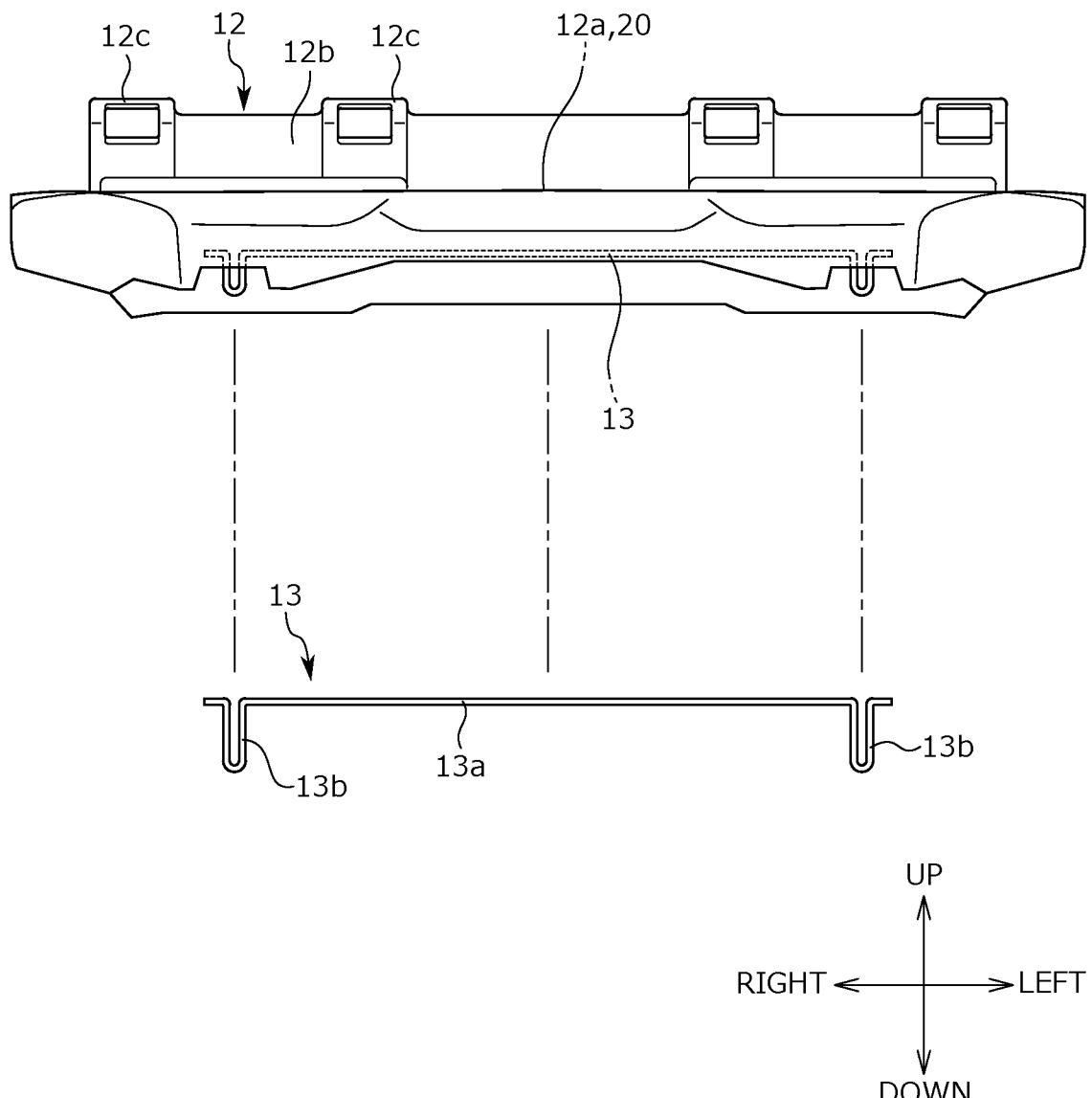
FIG. 3 is an exploded view (exploded front view) of the second pad material and a wire member.

As shown in FIGS. 1 to 3, the seat cushion 1 is a seating portion which supports the seated person from below and is constructed by covering a pad material 10 serving as a body portion of the seat cushion 1 with a skin material 1a.

As shown in FIG. 1, the seat back 2 is a backrest portion which supports the back of the seated person from behind and is constructed by covering a pad material 2a with a skin material 2b.

The seat cushion 1 is attached to a vehicle body (vehicle body frame) via a wire member 13 shown in FIG. 3. Further, the seat back 2 is attached to the vehicle body via a vehicle body connection member (not shown). In this way, the seat body is assembled to the vehicle body.

As shown in FIGS. 2 to 4, the pad material 10 is a pad laminate formed by vertically stacking a plurality of pad materials and includes a first pad material 11 which is disposed on the upper side (seated person side) and a second pad material 12 which is formed to be harder than the first pad material 11 and is disposed on the lower side (vehicle body side).

The first pad material 11 is attached to the upper surface of the second pad material 12 and is attached to cover the second pad material from above.

Specifically, when the first pad material 11 and the second pad material 12 are assembled, the first pad material 11 is in contact with the upper surface, the front surface, and both side surfaces of the second pad material 12 in the substantially entire surfaces and is also in contact with a part of the back surface of the second pad material 12.

Further, when the first pad material 11 and the second pad material 12 are assembled, a part (anchor passage portion 12c) of the rear portion of the second pad material 12 is exposed upward.

As shown in FIG. 2, the first pad material 11 is made of, for example, a resin material such as urethane foam.

The front surface of the first pad material 11 is provided with a first skin hanging groove 11a and a second skin hanging groove 11b for hanging the skin material 1a.

The first skin hanging grooves 11a are a plurality of vertical hanging grooves that are formed at intervals in the seat width direction and extend in the front to rear direction of the seat.

The second skin hanging groove 11b is a horizontal hanging groove that is formed on the front surface of the first pad material 11 at a substantially center portion in the front to rear direction of the seat and extends in the seat width direction.

The second skin hanging groove 11b connects the adjacent first skin hanging grooves 11a.

The rear end of the first pad material 11 is provided with a plurality of hook-shaped attachment portions 11c which are provided at intervals in the seat width direction and are attached to an attached portion 12b provided in the second pad material 12 and an opening portion 11d which is disposed between the adjacent attachment portions 11c.

The anchor passage portion 12c of the second pad material 12 is exposed upward via the opening portion 11d.

In the above-described configuration, as shown in FIG. 2, the first skin hanging groove 11a, the second skin hanging groove 11b, and the detection sensor 40 are arranged at different positions (positions that do not overlap) when viewed from above.

When the detection sensor 40 is disposed to avoid the position directly below the skin hanging grooves 11a and 11b in this way, the detection performance of the detection sensor 40 for a seating pressure can be improved.

Further, the first skin hanging groove 11a, the second skin hanging groove 11b, and the connecting member 50 are arranged at positions as different as possible (positions that do not overlap) when viewed from above. That is, the connecting member 50 is disposed to overlap the body portion of the first pad material 11.

In this way, it is possible to further suppress the connecting member 50 from coming off unintentionally or shifting its position.

As shown in FIGS. 2 to 4, the second pad material 12 is made of, for example, a resin material (foamed resin) such as foamed polypropylene and is formed by insert-molding the wire member 13.

The second pad material 12 is provided on the back surface side of the first pad material 11 and is disposed to overlap the first pad material 11 in the up to down direction.

The front surface of the second pad material 12 is provided with a sensor accommodation concave portion 12a (sensor accommodation portion) which is provided to be recessed in the thickness direction of the pad material 10 and accommodates the detection sensor 40 and an accommodation groove 20 which is provided to be continuous to the sensor accommodation concave portion 12a and accommodates the connecting member 50.

Further, the rear end of the second pad material 12 is provided with the plurality of convex attached portions 12b which are provided at intervals in the seat width direction and are attached to the attachment portion 11c of the first pad material 11 and the anchor passage portion 12c which is disposed between the adjacent attachment portions 11c.

The anchor passage portion 12c is a through-hole through which an anchor member (extending member) (not shown) is passed, and specifically, is a through-hole through which an anchor member for connecting a child seat is passed.

Furthermore, the anchor member is attached to the vehicle body, passes through the anchor passage portion 12c from the vehicle body, and is assembled to protrude forward from the seat body.

As shown in FIG. 3, the wire member 13 is a vehicle body assembly member for assembling the conveyance seat S to the vehicle body, and is fixed inside the front portion of the seat cushion 1.

Specifically, the wire member 13 is molded (insert-molded) together with the second pad material 12 and is fixed inside the second pad material 12.

The wire member 13 includes a wire body portion 13a which is provided inside the second pad material 12 and extends long in the seat width direction and right and left wire assembly portions 13b which are formed at both ends of the wire body portion 13a, protrude downward from the wire body portion 13a, and are exposed from the second pad material 12 to the outside.

The right and left wire assembly portions 13b are assembled to an assembly portion provided in a vehicle body (vehicle body frame) (not shown).

Furthermore, the vehicle body connection member (not shown) for connecting to a connected portion provided in the vehicle body is also fixed to the seat back 2 (pad material 2a).

With the above-described configuration, the seat body is assembled to the vehicle body.

Figure 5:
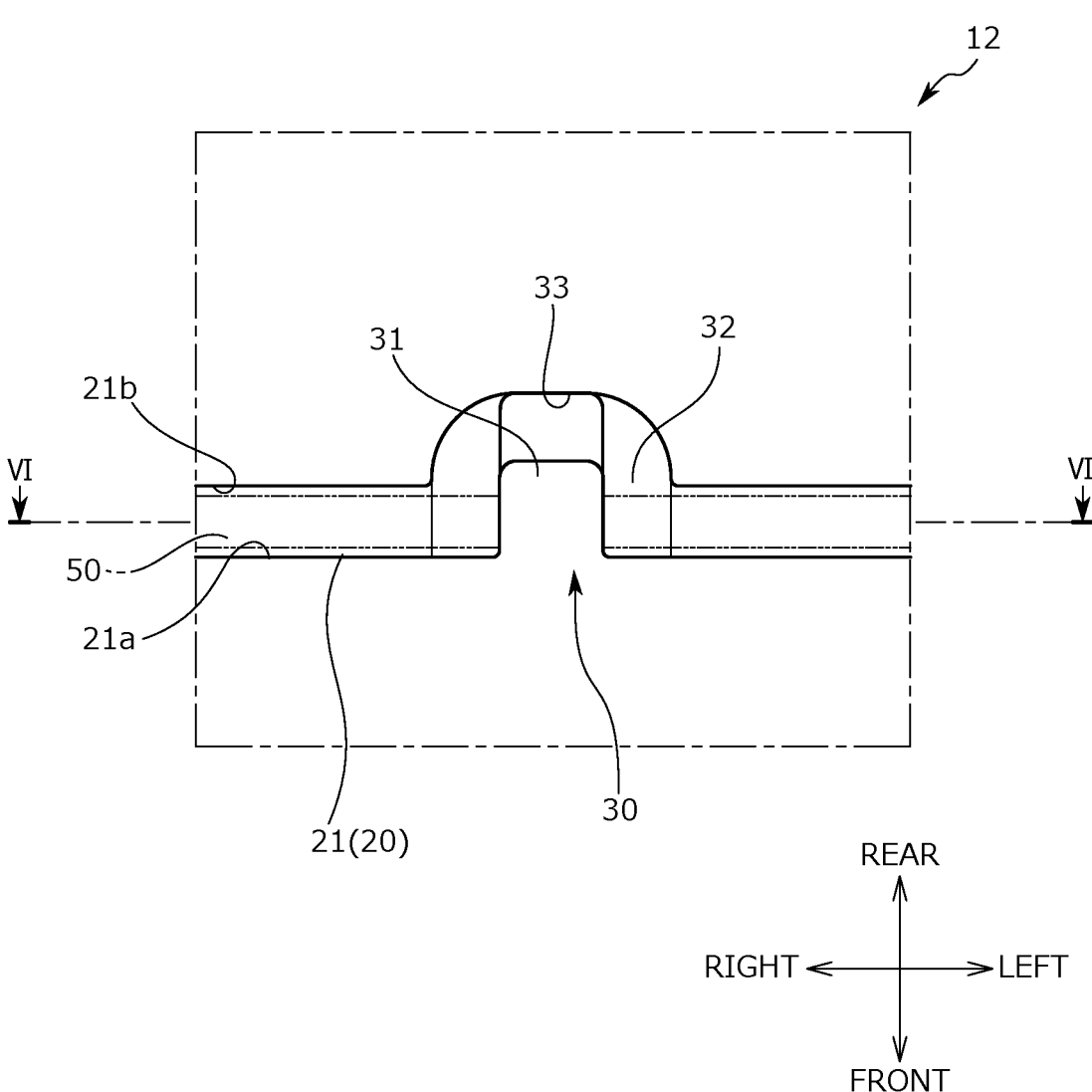
FIG. 5 is a main enlarged view of FIG. 4 and is a view showing a latching portion.
Figure 6:
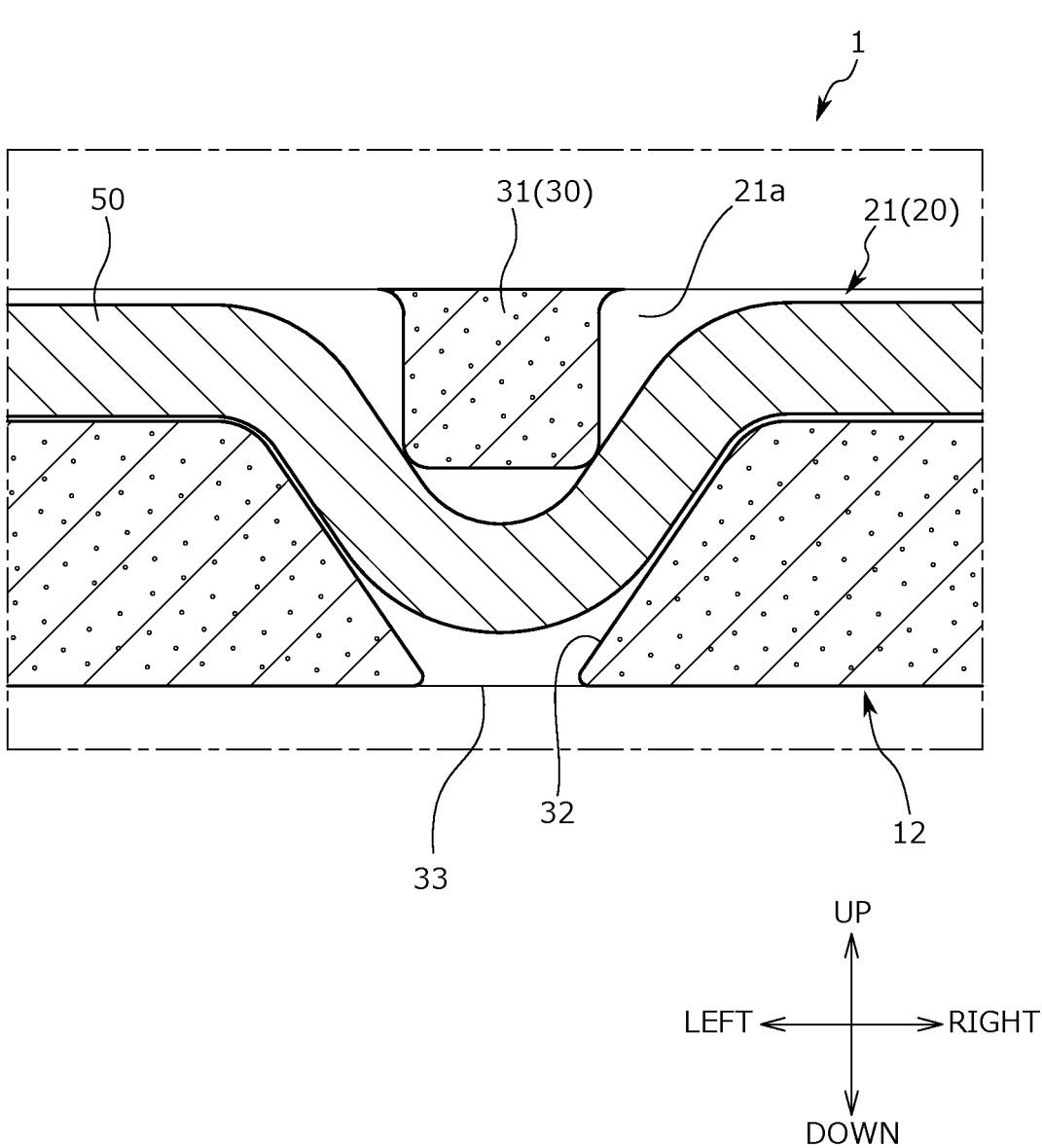
FIG. 6 is a cross-sectional view taken along a line VI-VI of FIG. 5 and is a view showing a state in which the connecting member is latched.

As shown in FIGS. 4 to 6, the accommodation groove 20 is a groove for accommodating the connecting member 50, is formed on the front surface of the second pad material 12, and is provided to face the back surface of the first pad material 11.

Furthermore, the accommodation groove 20 is formed on the front surface of the second pad material 12, but the present invention is not particularly limited. For example, the accommodation groove may be formed on the back surface of the second pad material 12. Alternatively, the accommodation groove may be formed on the back surface of the first pad material 11 or the front surface of the first pad material 11.

The accommodation groove 20 includes a groove body portion 21 which extends long in the seat width direction and a plurality of groove extension portions 22 which are formed at intervals in the seat width direction and respectively extend toward the front side of the seat from the groove body portion 21.

A latching portion 30 for latching the connecting member is formed at a predetermined position in the extension direction of the groove body portion 21.

The groove body portion 21 extends from a side position (left side position) in the seat width direction of the second pad material 12 to one end (right end) in the seat width direction.

Specifically, the groove body portion 21 corresponds to the position of the detection sensor 40 disposed on the front surface of the second pad material 12 and extends in a meandering manner to avoid the hole (concave portion) formed on the front surface of the second pad material 12. The hole (concave portion) is, for example, a fitting hole (fitting concave portion) fitted to an attachment convex portion provided on the bottom surface of the first pad material 11. Alternatively, the hole is a guide hole (guide concave portion) for routing the connecting member (harness) other than the connecting member 50.

The groove extension portion 22 connects the groove body portion 21 and the sensor accommodation concave portion 12a.

The plurality of sensor accommodation concave portions 12a are formed and specifically, they are formed at a center position, a left side position, and a right side position in the seat width direction.

The groove extension portion 22 corresponds to each sensor accommodation concave portion 12a and is formed at a center position, a left side position, and a right side position in the seat width direction.

As shown in FIGS. 4 to 6, the plurality of latching portions 30 are for latching the connecting member 50 and are formed at intervals in the extension direction of the accommodation groove 20.

Specifically, the latching portion 30 is disposed between the plurality of sensor accommodation concave portions 12*a* in the seat width direction.

As shown in FIGS. 5 and 6, the latching portion 30 is for accommodating the connecting member 50 and includes a protrusion portion 31 which protrudes from one side portion 21*a* toward the other side portion 21*b* of the accommodation groove 20 (groove body portion 21).

Further, the latching portion 30 includes a concave portion 32 which is provided at a position (directly lower position) corresponding to the protrusion portion 31 in the bottom surface of the groove body portion 21 and is formed to be recessed downward and a through-hole 33 which is formed in the bottom surface of the concave portion 32 and penetrates in the up to down direction.

The protrusion portion 31 protrudes backward from the upper portion of the side portion 21*a* located on the front side of the groove body portion 21 toward the side portion 21*b* located on the rear side of the groove body portion 21.

Specifically, as shown in FIG. 6, the protrusion portion 31 projects toward the rear side of the seat than the groove body portion 21.

Therefore, the protrusion portion 31 covers the connecting member 50 accommodated in the accommodation groove 20 from above and can appropriately latch the connecting member 50.

Furthermore, the protrusion portion 31 may protrude forward from the side portion 21*b* of the groove body portion 21 toward the side portion 21*a*.

The concave portion 32 is a recess having an inner surface that slopes inward from the upper side toward the lower side. In other words, the concave portion 32 is a recess having an inverted tapered shape.

The concave portion 32 is provided at the lower position (directly lower position) of the protrusion portion 31, is formed to have a larger width than the protrusion portion 31 in the seat width direction, and is formed to be longer than the protrusion portion 31 in the front to rear direction of the seat.

More specifically, the concave portion 32 is formed to project toward the rear side of the seat than the protrusion portion 31.

The through-hole 33 is a rectangular hole formed on the bottom surface of the concave portion 32.

The through-hole 33 is provided at the directly lower position of the protrusion portion 31 and is formed to have substantially the same width as the protrusion portion 31 in the seat width direction. Further, the through-hole is formed to project backward than the protrusion portion 31.

By forming the through-hole 33, for example, it can be visually confirmed using the through-hole 33 that the connecting member 50 is latched to the latching portion 30 (protrusion portion 31).

In the above-described configuration, as shown in FIG. 4, the protrusion portion 31 protrudes from the side portion 21*a* located on the front side of the groove body portion 21 toward the rear side of the seat. Then, the concave portion 32 is formed to project from the groove body portion 21 toward the rear side of the seat.

That is, the protrusion portion 31 and the concave portion 32 protrude from the groove body portion 21 toward the rear side of the seat and the groove extension portion 22 protrudes toward the front side of the seat.

In this way, the groove body portion 21, the groove extension portion 22, the protrusion portion 31, and the concave portion 32 can be arranged in a well-balanced manner in the front surface of the second pad material 12. That is, the second pad material can be arranged so as to minimize interference with other components on the front surface thereof.

In the above-described configuration, as shown in FIG. 5, the concave portion 32 is formed to project from the accommodation groove 20 toward the side portion 21*b* of the accommodation groove 20.

Then, a portion formed on the bottom surface of the accommodation groove 20 in the concave portion 32 is positioned to face the latching portion 30. Further, a portion that projects from the accommodation groove 20 in the concave portion 32 is positioned not to face the latching portion 30.

In this way, the connecting member 50 can be easily assembled to the latching portion 30 formed in the accommodation groove 20 with a simple structure.

Specifically, a guide portion (concave portion 32) for assembling the connecting member 50 is formed around the latching portion 30. Therefore, a structure in which the connecting member 50 is easily assembled is obtained.

In the above-described configuration, as shown in FIG. 5, a portion formed on the bottom surface of the accommodation groove 20 in the concave portion 32 extends to the outer position than both ends of the latching portion 30 in the extension direction of the accommodation groove 20.

In this way, since the concave portion 32 serves as the guide portion, the connecting member 50 is more easily assembled to the latching portion 30.

As shown in FIGS. 4 and 7, the detection sensor 40 is a sheet-shaped pressure sensor which detects a seating pressure applied to the seating surface of the seat cushion 1 when the seated person is seated on the seat and is attached to the front surface of the second pad material 12.

Here, the "seating pressure" is a value that changes periodically in response to the physiological activity of the seated person, specifically, breathing, when the seated person is seated on the seat cushion 1 and is a target value detected by the pressure sensor.

Furthermore, the detection sensor 40 may be a seating sensor that turns on or off depending on the seating pressure of the seated person. Preferably, a push switch type seating sensor may be used.

The plurality of detection sensors 40 are provided at intervals in the seat width direction, are respectively accommodated in the sensor accommodation concave portions 12*a* of the second pad material 12, and are arranged not to project from the second pad material 12 as much as possible.

Each detection sensor 40 is disposed at a hip point position of the seated person or a position corresponding to the vicinity of the hip point. Further, each detection sensor independently detects the seating pressure and outputs a detection signal based on the detection result of the seating pressure.

As shown in FIG. 4, the detection sensor 40 includes a sensor detection unit 41 which detects the seating pressure of the seated person and a transmission path 42 which outputs a detection signal when the sensor detection unit 41 detects the seating pressure.

The sensor detection unit 41 is a pressure-sensitive switch adhered onto a conductive sheet.

The transmission path 42 is formed by bonding a conductive wire serving as a transmission path onto a conductive sheet.

The transmission path 42 extends from the sensor detection unit 41 toward the rear side of the seat and is electrically connected to the connecting member 50.

As shown in FIGS. 4 to 7, the connecting member 50 is a wire harness formed by bundling conductive wires, and is accommodated in the accommodation groove 20.

The connecting member 50 extends to be long in the seat width direction and connects the detection sensor 40 and the control device 60.

Specifically, one end of the connecting member 50 is connected to the detection sensor 40 and the other end thereof is exposed from the second pad material 12 and is connected to the control device 60.

Specifically, the connecting member 50 includes a body portion 51 which extends to be long in the seat width direction, a plurality of extension portions 52 which are formed at intervals in the seat width direction and respectively extend from the body portion 51 toward the front side of the seat, and a coupler 53 which is provided at the other end (right end) of the body portion 51 and is connected to the control device 60.

As shown in FIG. 7, the control device 60 is a device which processes biological signals detected by the detection sensor 40, and is attached inside the conveyance seat S.

The control device 60 includes a communication unit 61 which receives biological signals detected by the detection sensor 40 and wirelessly transmits the biological signals to the outside and a control unit 62 which performs a process of transmitting the biological signals detected by the detection sensor 40 to the communication unit 61.

The communication unit 61 is connected to an external terminal, for example, a tablet terminal, a smartphone, a computer such as a PC, or an electrical device using wireless communication technology, and transmits and receives electrical signals (data signals).

The control unit 62 corresponds to a microcomputer and comprehensively performs electrical control.

The control device 60 receives power from a power source 70 installed in the conveyance.

Furthermore, the control device 60 may be attached inside the conveyance seat S or outside the conveyance seat S.

In the above-described configuration, the control device 60 is connected via a network to a safety device such as a seat belt device (not shown) and a movable device that moves a part or all of the seat body, and transmits an activation signal to these devices. For example, control is performed to notify the seated persons to fasten their seat belts. Alternatively, the control device controls the operation of the movable device.

Other Embodiments

In the above-described embodiment, as shown in FIG. 2, the pad material 10 is constructed by stacking the first pad material 11 and the second pad material 12, but the present invention is not particularly limited.

For example, the pad material 10 may be constructed by stacking three or more pad materials. In that case, in the pad material 10, the first pad material closest to the seated person may be relatively soft and the pad materials after the second pad material may be harder than the first pad material. Further, in that case, the detection sensor 40 may be attached to the front or back surface of the relatively hard second or third pad material.

In the above-described embodiment, as shown in FIG. 2, the accommodation groove 20 (groove body portion 21)

extends to be long in the seat width direction, but the present invention is not particularly limited.

For example, the accommodation groove 20 may extend in the front to rear direction of the seat or may extend to intersect (to be inclined with respect to) the front to rear direction of the seat.

In the above-described embodiment, as shown in FIG. 4, the accommodation groove 20 is provided at a position on the rear side of the seat than each detection sensor 40 on the front surface of the second pad material 12 and extends to be long in the seat width direction, but the present invention is not particularly limited.

For example, the accommodation groove 20 may be disposed at a position on the front side of the seat than each detection sensor 40.

Further, for example, when the detection sensors 40 are arranged to be lined up in the front to rear direction of the seat, the accommodation groove 20 may be disposed at a position outside each detection sensor 40 in the seat width direction.

In the above-described embodiment, as shown in FIG. 4, the detection sensor 40 is a pressure sensor, but the present invention is not particularly limited. For example, the detection sensor can be changed if the detection sensor can detect a target value that changes when the seated person is seated on the seat.

For example, the detection sensor 40 may be a shape sensor that detects a value according to the skeletal shape of the seated person (the skeletal shape of the part of the seated person's body that is in contact with the seat) or a potential sensor or the like that detects the body potential of the seated person.

In the above-described embodiment, as shown in FIG. 4, the detection sensor 40 is attached inside the seat cushion 1, but the present invention is not particularly limited. For example, the detection sensor may be attached inside the seat back 2.

In that case, the detection sensor 40 may be attached to the front or back surface of the pad material 2a of the seat back 2. Preferably, the detection sensor may be attached to the front surface of the second pad material located on the rear side of the seat in the plurality of pad materials 2a stacked in the front to rear direction of the seat.

In the above-described embodiment, as shown in FIG. 5, the concave portion 32 is formed as the guide portion so that the connecting member 50 is easily latched to the latching portion 30 (protrusion portion 31), but the present invention is not particularly limited.

That is, a through-hole may be formed as the guide portion in addition to the concave portion. Of course, both the concave portion and the through-hole may be formed.

In the above-described embodiment, as shown in FIG. 7, the connecting member 50 connects the detection sensor 40 and the control device 60, but the present invention is not particularly limited.

That is, the connecting member 50 may connect a first electrical device (electric member) and a second electrical device (electric member).

In the above-described embodiment, the vehicle seat used in an automobile has been described as a specific example, but the present invention is not particularly limited. For example, the conveyance seat can be used for various seats such as office chairs for work, wheelchairs, children's chairs for shopping carts, and the like in addition to two-wheel seats for motorcycles, seats for vehicles such as trains and buses, and seats for vehicles such as airplanes and ships.

In this embodiment, the conveyance seat according to the present invention has been mainly described.

However, the above-described embodiment is only an example to facilitate understanding of the present invention, and does not limit the present invention. The present invention may be modified and improved without departing from its spirit, and it goes without saying that the present invention includes equivalents thereof.

Second Embodiment

Hereinafter, a second embodiment according to the present invention will be described with reference to FIGS. 8 to 17.

TECHNICAL FIELD

The second embodiment of the present invention relates to a conveyance seat and particularly to a conveyance seat of which a seat body can be flipped up.

BACKGROUND ART

As a second or third row seat of a vehicle, a tumble seat is known in which a seat back is rotatably attached to a rear end of a seat cushion, and a folded seat body rotates forward about its front end to be in an upright accommodated state. In such a tumble seat, a hinge mechanism provided at a front end of the seat cushion allows the seat body to be swingable between an upright position in which the rear end of the seat cushion is flipped up and a forward folded state in which the seat back is folded and the rear end is locked to a vehicle floor.

In such a tumble seat, when the seat body is flipped up, an abnormal noise may be generated from the hinge mechanism or the like provided at the front end of the seat cushion. JP 2019-59339 A discloses a technology of suppressing the generation of abnormal noise by providing a rubber member contacting a member (upper member) causing abnormal noise in a hinge mechanism and reducing a contact impact by the elastic deformation of the rubber member.

SUMMARY OF INVENTION

Technical Problem

However, in order to provide a rubber member or the like in the hinge mechanism for the purpose of suppressing the generation of abnormal noise, not only the rubber member but also a member for fixing the rubber member is required. As a result, there is a significant increase in the number of components.

The second embodiment of the present invention has been made in view of the above-described problems and an object thereof is to provide a conveyance seat capable of suppressing generation of abnormal noise when a seat body is flipped up without increasing the number of components.

Solution to Problem

The above-described problems are solved by a conveyance seat according to the present invention including: a seat body which includes a seat cushion and a seat back connected to a rear end of the seat cushion to be folded forward; and a hinge mechanism which is provided at a front end of the seat cushion to change the seat back from a forward folded state of folding the seat back forward to an upright state of folding the seat back upright by flipping up the seat body forward against a floor, in which the hinge mechanism includes a hinge shaft which extends in a seat width direction, a shaft support member which supports the hinge shaft, a fixed member that is joined to the shaft support member and fixes the hinge mechanism to the floor, and a biasing member that is provided around the hinge shaft and biases the seat body, in which the biasing member includes an engagement portion which engages with the fixed member or the shaft support member in accordance with the seat body state, in which the fixed member includes a first contact portion which comes into contact with the engagement portion of the biasing member to stop the movement of the engagement portion when the seat body is flipped up into the upright state, and in which the first contact portion is integrally provided in the fixed member so that the fixed member and the first contact portion are formed as a single component.

Since the engagement portion of the biasing member comes into contact with the first contact portion provided in the fixed member to stop the movement of the biasing member when the seat body is flipped up, it is possible to suppress the generation of abnormal noise due to the biasing member.

Further, since the first contact portion which comes into contact with the engagement portion of the biasing member is integrally provided in the fixed member so that the first contact portion and the fixed member are formed as a single component, the number of members does not increase.

Further, in the conveyance seat, the first contact portion may be formed by cutting and raising a part of the fixed member.

Since the first contact portion is formed by cutting and raising, the first contact portion can be easily integrated with the fixed member. Further, since it is a simple method, manufacturing costs can be reduced.

Further, in the conveyance seat, the engagement portion may extend from the end of the biasing member in the seat width direction and the length of the first contact portion in the seat width direction may be shorter than the length of the engagement portion of the biasing member in the seat width direction.

Since the length of the first contact portion in the seat width direction is shorter than the length of the engagement portion, cost can be reduced. Further, since the entire engagement portion of the biasing member is not supported, the biasing member is not excessively restrained and hence the stress applied to the first contact portion can be moderated.

Further, in the conveyance seat, the shaft support member may include a second contact portion which comes into contact with the engagement portion of the biasing member to stop the movement of the engagement portion when the seat body changes from the upright state to the forward folded state, the second contact portion may be integrally provided in the shaft support member, and the shaft support member and the second contact portion may be formed as a single component.

Since the shaft support member is provided with the second contact portion which comes into contact with the engagement portion of the biasing member, the engagement portion can come into contact with the second contact portion to stop the movement of the engagement portion when the upright state changes to the forward folded state. Further, since the second contact portion is integrally provided in the shaft support member so that the shaft support member and the second contact portion are formed as a single component, the number of components does not increase.

Further, in the conveyance seat, the shaft support member may include a pair of bearing portions which are arranged to face each other in the seat width direction and support the hinge shaft and a front wall portion which connects the pair of bearing portions, and the second contact portion may be formed in a convex shape that protrudes from the front wall portion of the shaft support member toward the biasing member.

Since the second contact portion is formed in the shaft support member to have a convex shape, the second contact portion can be easily integrally provided in the shaft support member. Further, since the second contact portion can be formed by a simple method, manufacturing costs can be reduced.

Further, in the conveyance seat, a plurality of the second contact portions may be provided in the shaft support member, the length of each of the plurality of second contact portions in the seat width direction may be formed to be smaller than the length of the first contact portion in the seat width direction, and the plurality of second contact portions may be arranged to avoid the center portion of the shaft support member in the seat width direction.

Since the plurality of second contact portions are provided, the movement of the engagement portion of the biasing member can be more reliably stopped.

Further, since the length of each of the second contact portions in the seat width direction is shorter than the length of the first contact portion in the seat width direction, manufacturing costs can be reduced.

Further, since the plurality of second contact portions are arranged to avoid the center portion of the shaft support member, the biasing member is not excessively restrained and hence the stress applied to the second contact portion can be moderated even when the biasing member is deformed when torque is applied to the biasing member.

Further, in the conveyance seat, a through-hole may be formed between the plurality of second contact portions.

Since the through-hole is provided between the plurality of second contact portions, the weight can be reduced.

Further, in the conveyance seat, the first contact portion may be disposed in the fixed member to be located between the plurality of second contact portions arranged at intervals in the seat width direction when viewed from the front and the first contact portion may be disposed not to overlap the second contact portion in the front to rear direction.

Since the first contact portion is disposed to be located between the plurality of second contact portions, the contact positions of the engagement portion of the biasing member with respect to the first contact portion and the second contact portion are changed in the seat width direction and hence stress is no longer concentrated in one area. Accordingly, the durability of the biasing member can be improved.

Further, in the conveyance seat, the plurality of second contact portions may be arranged so that the arrangement interval in the seat width direction is larger than the length of the first contact portion in the seat width direction.

The area of the contact portion between each second contact portion and the engagement portion is small, but since the arrangement interval of the plurality of second contact portions is larger than the length of the first contact portion in the seat width direction, it is possible to stably support the engagement portion and stop the movement of the engagement portion.

Further, in the conveyance seat, a reinforcement portion may be provided in the fixed member at a position overlapping the first contact portion in the front to rear direction.

Since the reinforcement portion is provided at a position overlapping the first contact portion in the front to rear direction, the strength in the front to rear direction is increased and the first contact portion can more stably support the engagement portion.

Advantageous Effects of Invention

According to the present invention, since the engagement portion of the biasing member comes into contact with the first contact portion provided in the fixed member to stop the movement of the biasing member when the seat body is flipped up, it is possible to suppress the generation of abnormal noise due to the biasing member. Further, since the first contact portion which comes into contact with the engagement portion of the biasing member is integrally provided in the fixed member, the number of members does not increase.

Further, since the first contact portion is formed by cutting and raising, the first contact portion can be easily integrated with the fixed member. Further, since it is a simple method, manufacturing costs can be reduced.

Further, since the length of the first contact portion in the seat width direction is shorter than the length of the engagement portion, cost can be reduced. Further, since the entire engagement portion of the biasing member is not supported, the biasing member is not excessively restrained and hence the stress applied to the first contact portion can be moderated.

Further, since the shaft support member is provided with the second contact portion which comes into contact with the engagement portion of the biasing member, the engagement portion can come into contact with the second contact portion to stop the movement of the engagement portion when the upright state changes to the forward folded state. Further, since the second contact portion is integrally provided in the shaft support member, the number of components does not increase.

Further, since the second contact portion is formed in the shaft support member to have a convex shape, the second contact portion can be easily integrally provided in the shaft support member. Further, since the second contact portion can be formed by a simple method, manufacturing costs can be reduced.

Further, since the plurality of second contact portions are provided, the movement of the engagement portion of the biasing member can be more reliably stopped. Further, since the length of each of the second contact portions in the seat width direction is shorter than the length of the first contact portion in the seat width direction, manufacturing costs can be reduced. Further, since the plurality of second contact portions are arranged to avoid the center portion of the shaft support member, the biasing member is not excessively restrained and hence the stress applied to the second contact portion can be moderated even when the biasing member is deformed when torque is applied to the biasing member.

Further, since the through-hole is provided between the plurality of second contact portions, the weight can be reduced.

Further, since the first contact portion is disposed to be located between the plurality of second contact portions, the contact positions of the engagement portion of the biasing member with respect to the first contact portion and the second contact portion are changed in the seat width direction and hence stress is no longer concentrated in one area. Accordingly, the durability of the biasing member can be improved.

Further, the area of the contact portion between each second contact portion and the engagement portion is small, but since the arrangement interval of the plurality of second contact portions is larger than the length of the first contact portion in the seat width direction, it is possible to stably support the engagement portion and stop the movement of the engagement portion.

Further, since the reinforcement portion is provided at a position overlapping the first contact portion in the front to rear direction, the strength in the front to rear direction is increased and the first contact portion can more stably support the engagement portion.

DESCRIPTION OF EMBODIMENTS

Hereinafter, an embodiment in which a conveyance seat according to the present invention is applied to rear seats (including second and third row seats) of an automobile will be described below with reference to the drawings. However, the embodiment described below is intended to facilitate understanding of the present invention, and is not intended to limit the present invention. That is, the present invention may be modified and improved without departing from its spirit, and it goes without saying that the present invention includes equivalents thereof. Further, in the following description, the content regarding the material, shape, and size of the seat components is only one specific example, and does not limit the present invention. Further, the present invention is not limited to vehicle seats mounted on ground vehicles with wheels such as automobiles and trains, but can also be applied to, for example, seats mounted on aircraft, ships, and the like that move other than on the ground.

In the following description, the "front to rear direction" is the front to rear direction of the vehicle seat and is the direction that matches the travel direction when the vehicle travels. Further, the "seat width direction" and the "right to left direction of the seat" are the lateral width direction of the vehicle seat and are the directions that match the right to left direction when viewed from the occupant seated on the vehicle seat. Further, the "up to down direction" is the up to down direction of the vehicle seat and is the direction that matches the vertical direction when the vehicle travels on a horizontal plane.

Further, the right and left sides are determined based on the occupant seated on the vehicle seat. Further, in the right to left direction, the center side of the seat is referred to as the inside and the opposite side is referred to as the outside.

Further, the "outside of the vehicle" in the seat width direction means the side closer to the outside of the vehicle body (for ease of understanding, the side closest to the nearest door) and the "inside of the vehicle" means the side closer to the inside of the vehicle body (for ease of understanding, the side away from the nearest door).

Further, in the following description, "rotation" means a rotation movement about an axis along the seat width direction unless otherwise specified.

<Vehicle Seat SA>

A vehicle seat SA of this embodiment is a seat which is placed on a vehicle floor FL and on which an occupant of the vehicle is seated. The vehicle seat SA is used as a rear seat equivalent to the back seat of the vehicle. However, the present invention is not limited thereto and the vehicle seat SA can also be used as a second row mid seat or a third row rear seat in the vehicle having three rows of seats in the front to rear direction.

Figure 8:
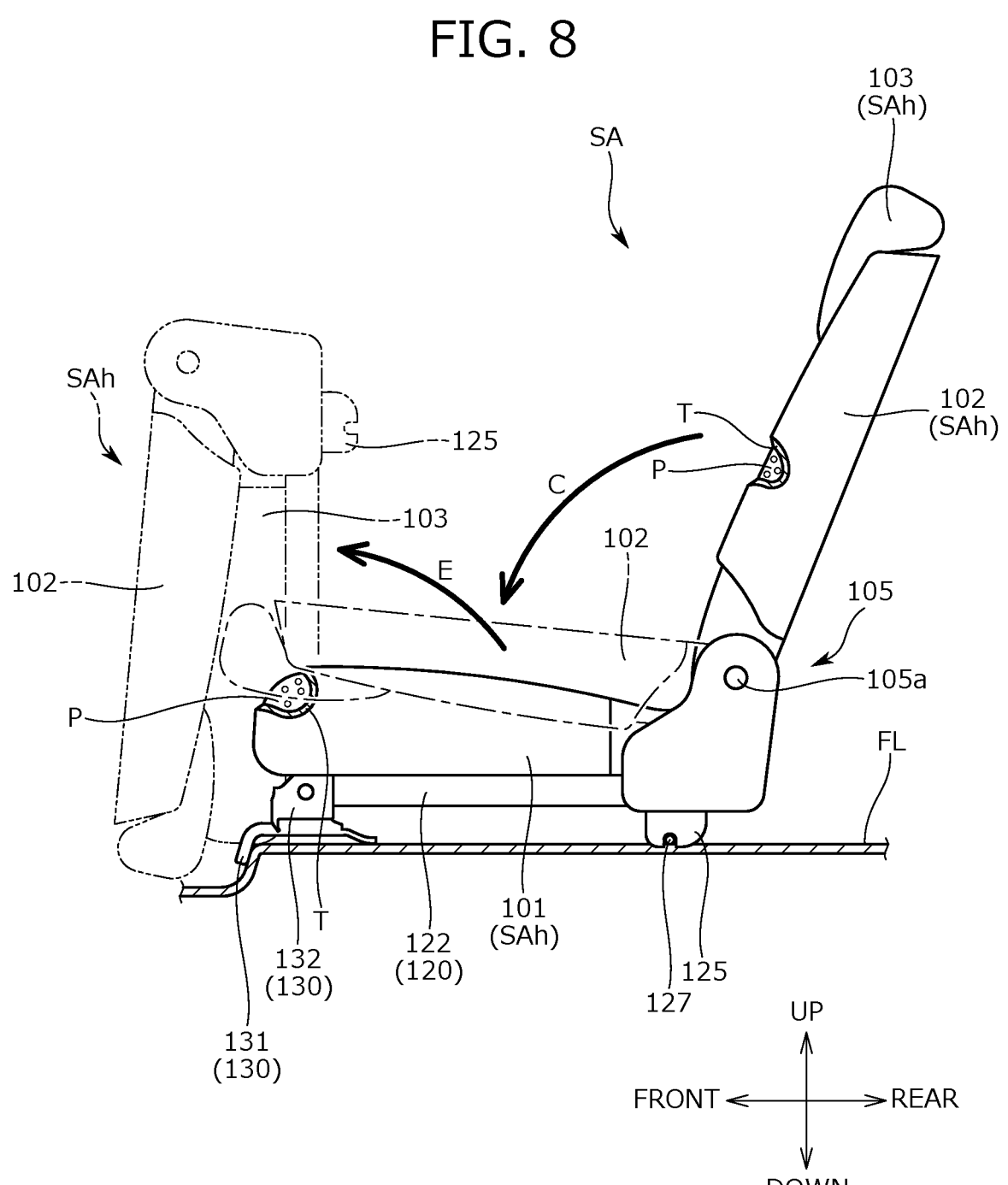
FIG. 8 is a side view showing a vehicle seat according to a second embodiment of the present invention.

FIG. 8 is a side view showing the vehicle seat SA according to this embodiment. The vehicle seat SA includes a seat body SAh forming its body portion. The vehicle seat SA is a tumble seat that can be accommodated by flipping up the seat body SAh against the vehicle floor (floor) FL. Furthermore, in FIG. 8, a part of the vehicle seat SA is shown with a trim cover T removed for convenience of illustration.

The seat body SAh includes a seat cushion 101 which supports the buttocks of the occupant, a seat back 102 which serves as a backrest for the occupant, and a headrest 103 which supports the head of the occupant. The seat back 102 is connected to the rear end of the seat cushion 101 via a known reclining mechanism 105 to be rotatable in the front to rear direction and the seat back 102 can be folded forward relative to the seat cushion 101 as indicated by the dashed line in FIG. 8.

Further, the vehicle seat SA includes a pair of hinge mechanisms 130 provided at the front end of the seat cushion in order to flip up the seat body SAh with the seat back 102 folded forward. The pair of hinge mechanisms 130 are provided on both right and left sides of the lower surface of the front end of the seat cushion 101 (see FIG. 9).

As indicated by the solid line in FIG. 8, the vehicle seat SA can be changed from a usage state (hereinafter, referred to as a seatable state) in which the occupant can be seated to a state (hereinafter, referred to as a forward folded state) in which the seat back 102 is folded forward in the direction of the arrow C of FIG. 8. Further, the vehicle seat can be changed from the forward folded state to a state (hereinafter, referred to as an upright state) in which the seat body SAh is raised forward in the direction of the arrow E of FIG. 8 against the vehicle floor FL as indicated by the dashed line in FIG. 8.

Specifically, when the occupant pulls an operation lever (not shown), the seat back 102 is folded forward. Then, when the occupant raises the rear end of the seat cushion 101, the seat body SAh can be in the upright state. Further, the occupant can return to the seatable state by manually folding the seat body SAh backward from the upright state, raising the seat back 102 upward, and rotating the seat back backward.

Figure 9:
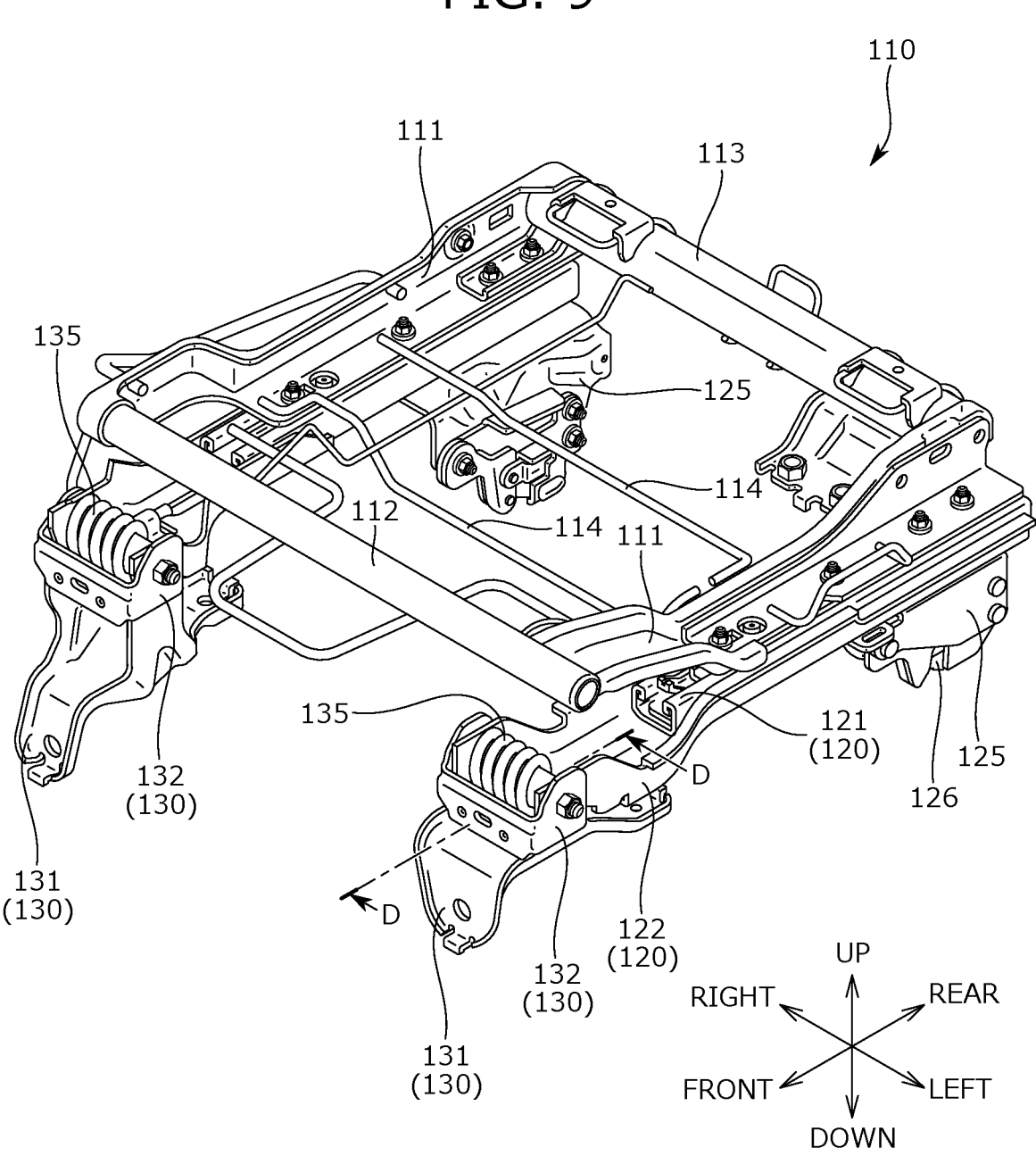
FIG. 9 is a perspective view showing a cushion frame when a vehicle seat is folded forward.

The seat cushion 101 is a seating portion which supports the occupant from below and is constructed by placing a pad P on a cushion frame 110 serving as a skeleton and covering them with the trim cover T from above the pad P as shown in FIG. 9.

The seat back 102 is a backrest portion that supports the back of the occupant from behind and is constructed by placing the pad P on a back frame (not shown) and covering them with the trim cover T.

The headrest 103 is a head portion that supports the head of the occupant from behind and is constructed by placing the pad P on a headrest pillar (not shown) serving as a core material and covering them with the trim cover T.

As described above, the rear end of the seat cushion 101 is provided with the reclining mechanism 105. The reclining mechanism 105 is configured as a known device and can rotate the seat back 102 forward in the direction of the arrow C in FIG. 8 about a seat rotation shaft 105*a*. Further, the reclining mechanism 105 includes a spiral spring (not shown) that biases the seat back 102 to maintain the forward folded state.

<Cushion Frame 110>

Figure 10:
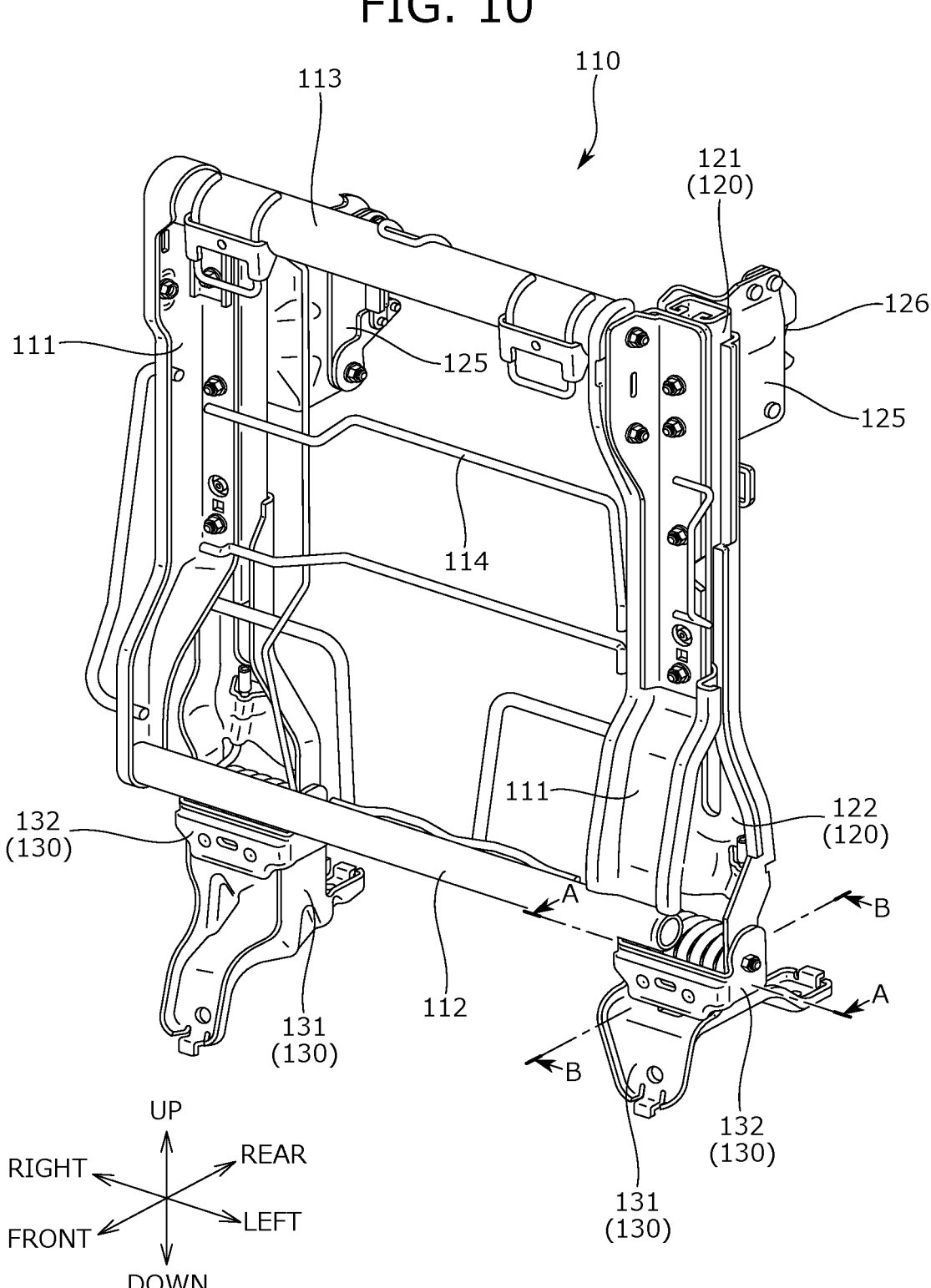
FIG. 10 is a perspective view showing the cushion frame when the vehicle seat is in an upright state.

Referring to FIGS. 9 and 10, the configuration of the cushion frame 110 serving as the skeleton of the seat cushion 101 will be described in more detail. FIG. 9 is a perspective view showing the cushion frame 110 when the seat body SAh is in the seatable state or the forward folded state and FIG. 10 is a perspective view showing the cushion frame 110 when the seat body SAh is in the upright state.

The cushion frame 110 is configured as a substantially rectangular frame-shaped body that serves as the skeleton of the seat cushion 101 and mainly includes right and left side frames 111 and 111 which are arranged on the right and left sides, a front connection pipe 112 which connects the front ends of the side frames 111 and 111, and a rear connection pipe 113 which connects the rear ends of the side frames as shown in FIG. 9.

Further, a wire 114 is provided across the side frames 111 and 111. This wire 114 serves as a pressure receiving member that receives a load from the seat cushion 101.

<Slide Rail 120>

Further, as shown in FIG. 9, slide rails 120 and 120 for adjusting the longitudinal position of the seat body SAh with respect to the vehicle floor FL is provided below the cushion frame 110. The slide rails 120 and 120 are conventionally known and include upper rails 121 and 121 which respectively connect the side frames 111 and 111 and lower rails 122 and 122 which respectively support the upper rails 121 and 121 to be slidable.

The hinge mechanisms 130 and 130 are provided at the front ends of the lower rails 122 and 122 of the right and left slide rails 120 and 120 and the seat body SAh is connected to the vehicle floor FL via the hinge mechanisms 130 and 130.

Furthermore, the present invention is not limited to the configuration in which the right and left slide rails 120 and 120 are provided on the lower surface of the seat cushion 101 and may adopt a configuration in which the right and left slide rails 120 and 120 are omitted. In that case, the hinge mechanisms 130 and 130 are provided at the front ends of the side frames 111 and 111 arranged on the right and left sides and the seat body SAh is connected to the vehicle floor FL via the right and left hinge mechanisms 130 and 130.

Further, the rear ends of the lower rails 122 and 122 are provided with lock mechanisms 125 and 125 which prohibit the rotation of the seat cushion 101 when the seat body SAh is in the seatable state. Each of the lock mechanisms 125 and 125 includes a hook 126 which engages with a striker 127 (see FIG. 8) provided in the vehicle floor FL. The lock of the lock mechanism 125 can be released by rotating the hook 126 and the occupant can raise the folded seat body SAh by raising the rear portion of the seat cushion 101.

<Hinge Mechanism 130>

Hereinafter, the hinge mechanism 130 which is the key of the present invention will be described with reference to FIGS. 11 to 17.

Figure 11:
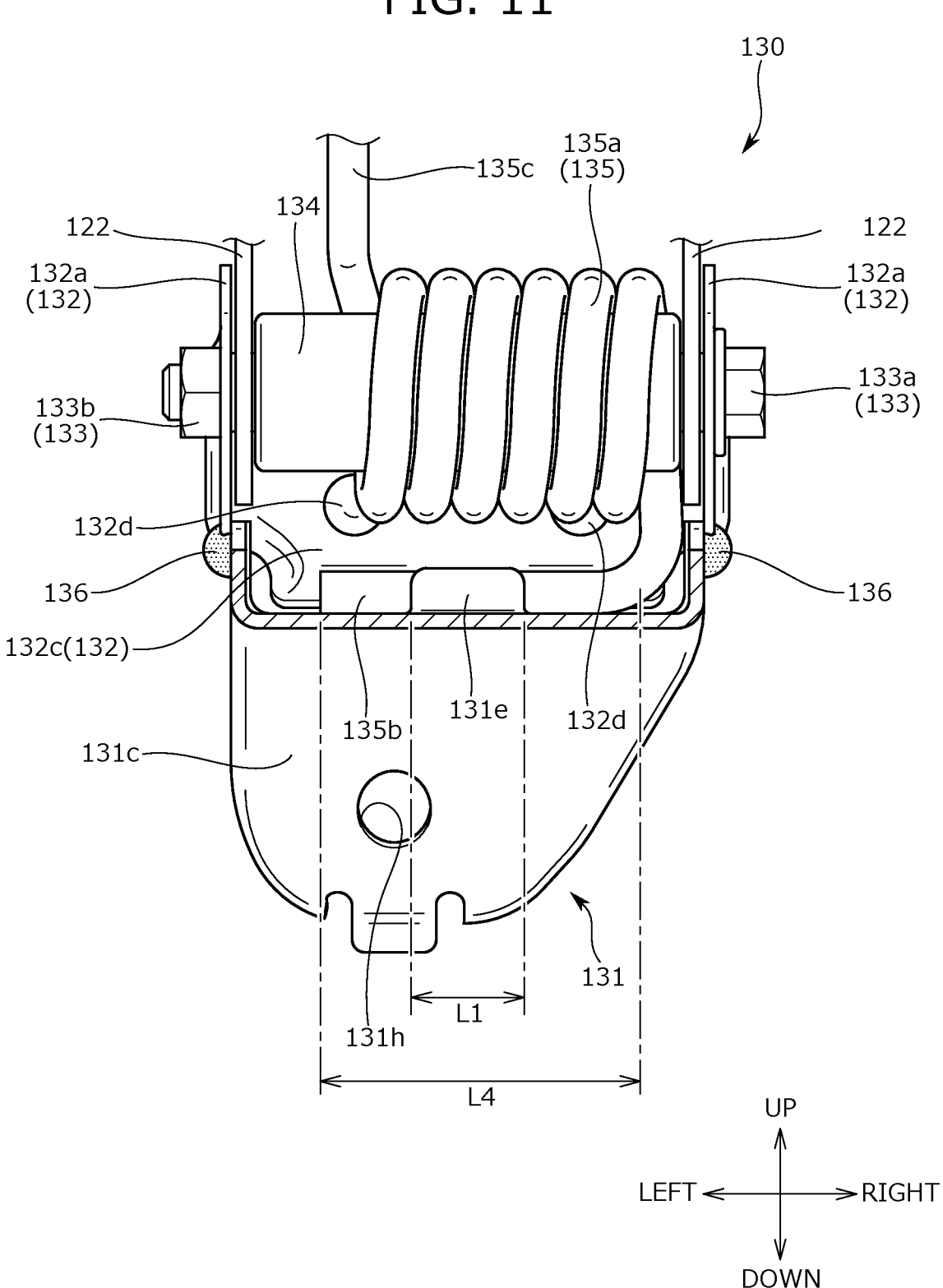
FIG. 11 is a cross-sectional view taken along a line A-A of FIG. 10 and is a view showing a hinge mechanism when the vehicle seat is in the upright state.
Figure 12:
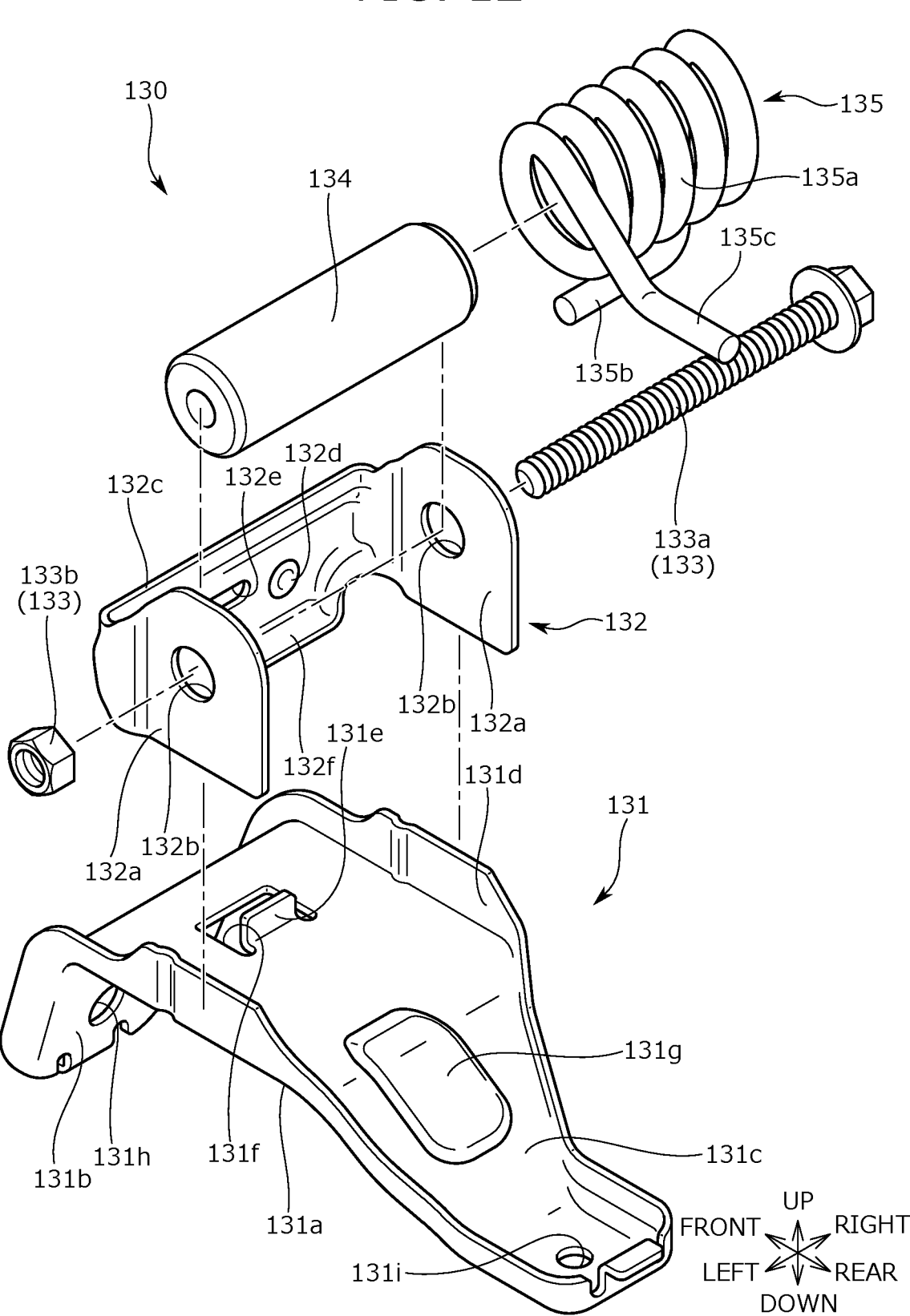
FIG. 12 is an exploded perspective view showing a configuration of the hinge mechanism.

As shown in FIGS. 11 and 12, the left hinge mechanism 130 includes a fixed bracket 131, a shaft support member 132, a hinge shaft 133, a spacer 134, and a coil spring 135. Since the right hinge mechanism 130 basically has the same configuration as the left hinge mechanism 130, detailed illustrations and descriptions are omitted. Hereinafter, the schematic entire configuration and operation of the hinge mechanism 130 will be described first, and then the detailed positional relationship between a first contact portion 131e and a second contact portion 132d will be described.

<Fixed Bracket 131>

The fixed bracket 131 corresponds to a fixed member of the present invention and is a member fixed to the vehicle floor FL. The fixed bracket 131 is formed, for example, by press-forming a steel plate.

The fixed bracket 131 includes a base portion 131a which is joined to the shaft support member 132, a front leg portion 131b, and a rear leg portion 131c.

The base portion 131a is formed in a rectangular plate shape and is disposed with the up to down direction of the vehicle as the thickness direction.

The front leg portion 131b extends obliquely downward from the front end of the base portion 131a. The front leg portion 131b is provided with a bolt hole 131h and a fastening member such as a bolt is passed through the bolt hole 131h to be fastened so that the front end of the fixed bracket 131 is fixed to the vehicle floor FL.

The rear leg portion 131c is provided to extend obliquely downward as it goes backward from the rear end of the base portion 131a. A bolt hole 131i is also formed at the rear end of the rear leg portion 131c and a fastening member such as a bolt is passed through the bolt hole 131i to be fastened so that the rear end of the fixed bracket 131 can be fixed to the vehicle floor FL.

A flange 131d is provided around the fixed bracket 131 and reinforces the fixed bracket 131.

The first contact portion 131e is formed at the center of the base portion 131a. When an engagement portion 135b of the coil spring 135 comes into contact with the first contact portion 131e, the movement of the engagement portion 135b is stopped and the rotation of the coil spring 135 is suppressed.

The first contact portion 131e is integrally provided in the fixed bracket 131 so that the fixed bracket 131 and the first contact portion 131e are formed as a single member. More specifically, the first contact portion 131e is formed by cutting and raising a part of the fixed bracket 131, more specifically, the base portion 131a, so as to protrude upward. Further, a through-hole 131f for cutting and raising the first contact portion 131e is formed around the first contact portion 131e.

Figure 14:
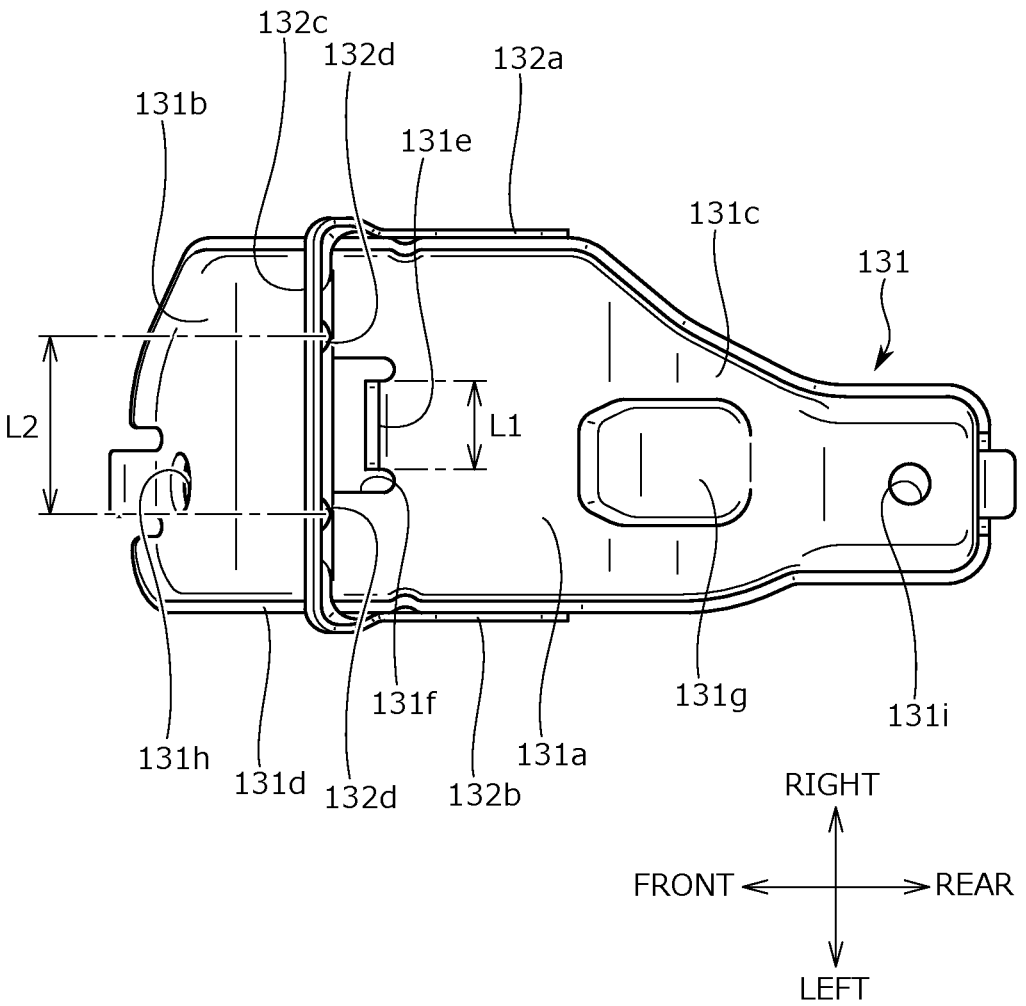
FIG. 14 is a plan view of the fixed bracket to which the shaft support member is attached.

Further, as shown in FIGS. 12 and 14, the first contact portion 131e extends upward from the rear side of the through-hole 131f. Since the first contact portion 131e is formed by cutting and raising, the height for supporting the engagement portion 135b can be increased compared to the case where the engagement portion 135b is formed by embossing.

Further, the first contact portion 131e is provided on the rear side of the through-hole 131f. With such an arrangement, a force acts in a direction that compresses the first contact portion 131e at the time of the contact of the engagement portion 135b of the coil spring 135. On the other hand, for example, when the first contact portion 131e is provided on the front side of the through-hole 131f, a force is applied in a direction of stretching the first contact portion 131e backward. Since the strength can be improved in the compression direction, it is possible to more stably support the engagement portion 135b by providing the first contact portion 131e on the rear side of the through-hole 131f.

Further, the length L1 of the first contact portion 131e in the seat width direction is shorter than the length L4 of the engagement portion 135b in the seat width direction.

Since the length L1 of the first contact portion 131e in the seat width direction is shorter than the length L4 of the engagement portion 135b, cost can be reduced. Further, since the entire engagement portion 135b is not supported, the coil spring 135 is not excessively restrained and hence the stress applied to the first contact portion 131e can be moderated.

Further, a bead 131g is formed in the rear leg portion 131c of the fixed bracket 131 as a reinforcement portion and reinforces the fixed bracket 131. As understood from FIG. 14, the bead 131g is provided at a position overlapping the first contact portion 131e to be described later in the front to rear direction. Since the bead 131g is provided at a position overlapping the first contact portion 131e in the front to rear direction, the strength of the fixed bracket 131 in the front to rear direction is improved and the first contact portion 131e can stably support the engagement portion 135b of the coil spring 135.

<Shaft Support Member 132>

The shaft support member 132 is a member that supports the hinge shaft 133 extending in the seat width direction. The shaft support member 132 includes a pair of bearing portions 132a which extend backward from both right and left side portions of a front wall portion 132c and the front wall portion 132c which connects the pair of bearing portions 132a and 132a. The shaft support member 132 is formed by bending a steel plate so that the entire shaft support member has a U-shape. Further, each of the bearing portions 132a and 132a is provided with a bearing hole 132b through which the columnar hinge shaft 133 passes and the shaft support member 132 supports the hinge shaft 133 by inserting the hinge shaft 133 through the bearing hole 132b.

Further, the shaft support member 132 is joined to the fixed bracket 131 by welding the lower end of the bearing portion 132a and the base portion 131a of the fixed bracket 131 (more specifically, the flange 131d of the base portion 131a). FIG. 11 shows welding marks 136 caused by welding.

<Hinge Shaft 133>

The hinge shaft 133 is disposed with the seat width direction as the axial direction. Further, as shown in FIG. 11, a front end of a lower rail 122 is disposed inside the shaft support member 132 and the lower rail 122 is rotatable around the hinge shaft 133.

The coil spring 135 which biases the lower rail 122 in one direction around the axis of the hinge shaft 313 (in the direction of flipping up the seat body SAh) with respect to the fixed bracket 131 and the cylindrical spacer 134 which holds the coil spring 135 concentrically with the hinge shaft 133 are provided around the axis of the hinge shaft 133.

The hinge shaft 133 includes a bolt 133a and a nut 133b and the hinge shaft 133 is fixed to the shaft support member 132 while rotatably supporting the coil spring 135 by the fastening of the nut 133b.

<Coil Spring 135>

The coil spring 135 includes the engagement portion 135b which once extends downward from the right end of the spring body 135a, is bent toward the spring body 135a, and extends in the seat width direction. The engagement portion 135b is configured to engage with the fixed bracket 131 or the shaft support member 132 in accordance with the state of the seat body SAh.

Figure 15:
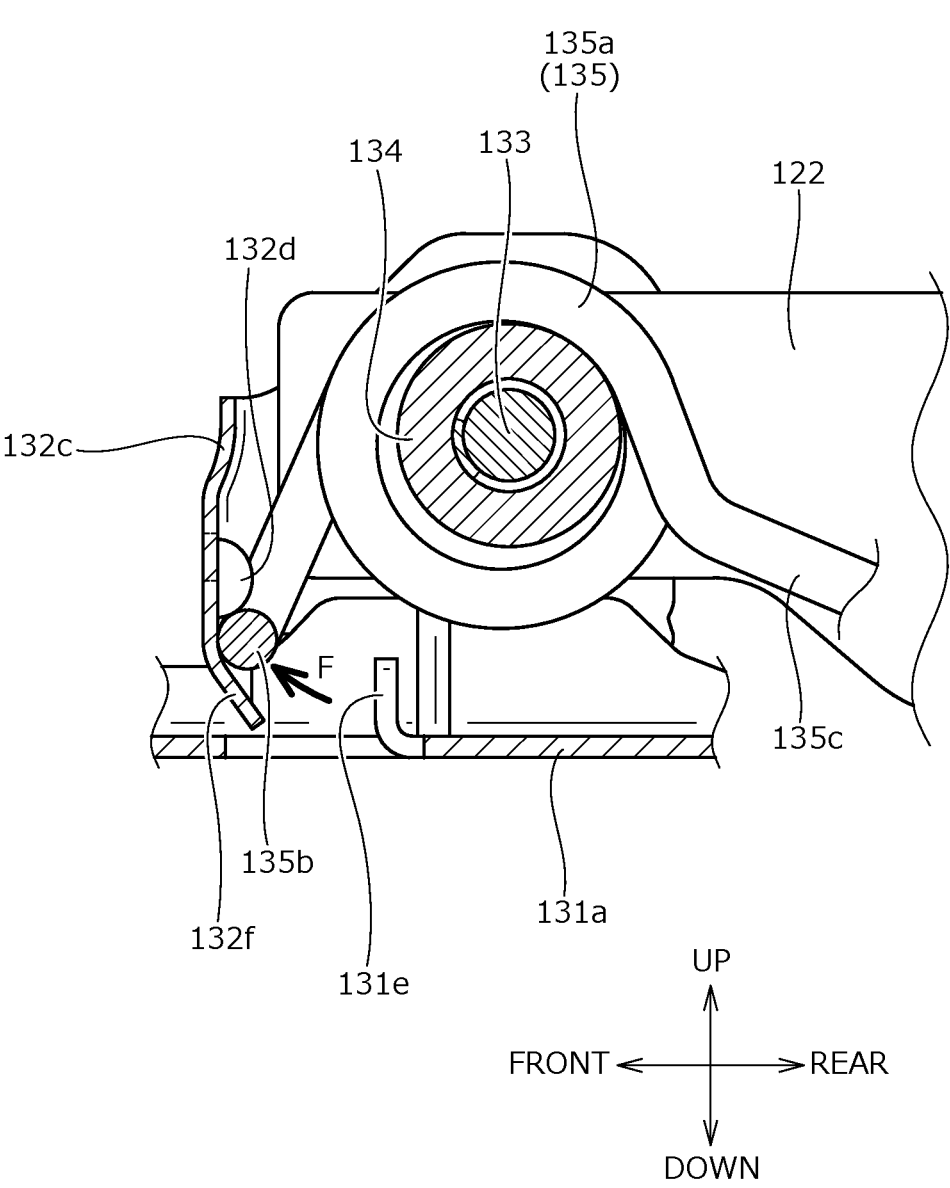
FIG. 15 is a cross-sectional view taken along a line D-D of FIG. 9 and is a view showing the hinge mechanism when the vehicle seat is folded forward.

More specifically, as shown in FIG. 15, when the seat body SAh is in the forward folded state, the rail support portion 135c of the coil spring 135 engages with the lower rail 122 and rotates to be inclined backward so that the engagement portion 135b also rotates in the direction of the arrow F. Accordingly, the engagement portion 135b engages with the front wall portion 132c of the shaft support member 132.

Figure 16:
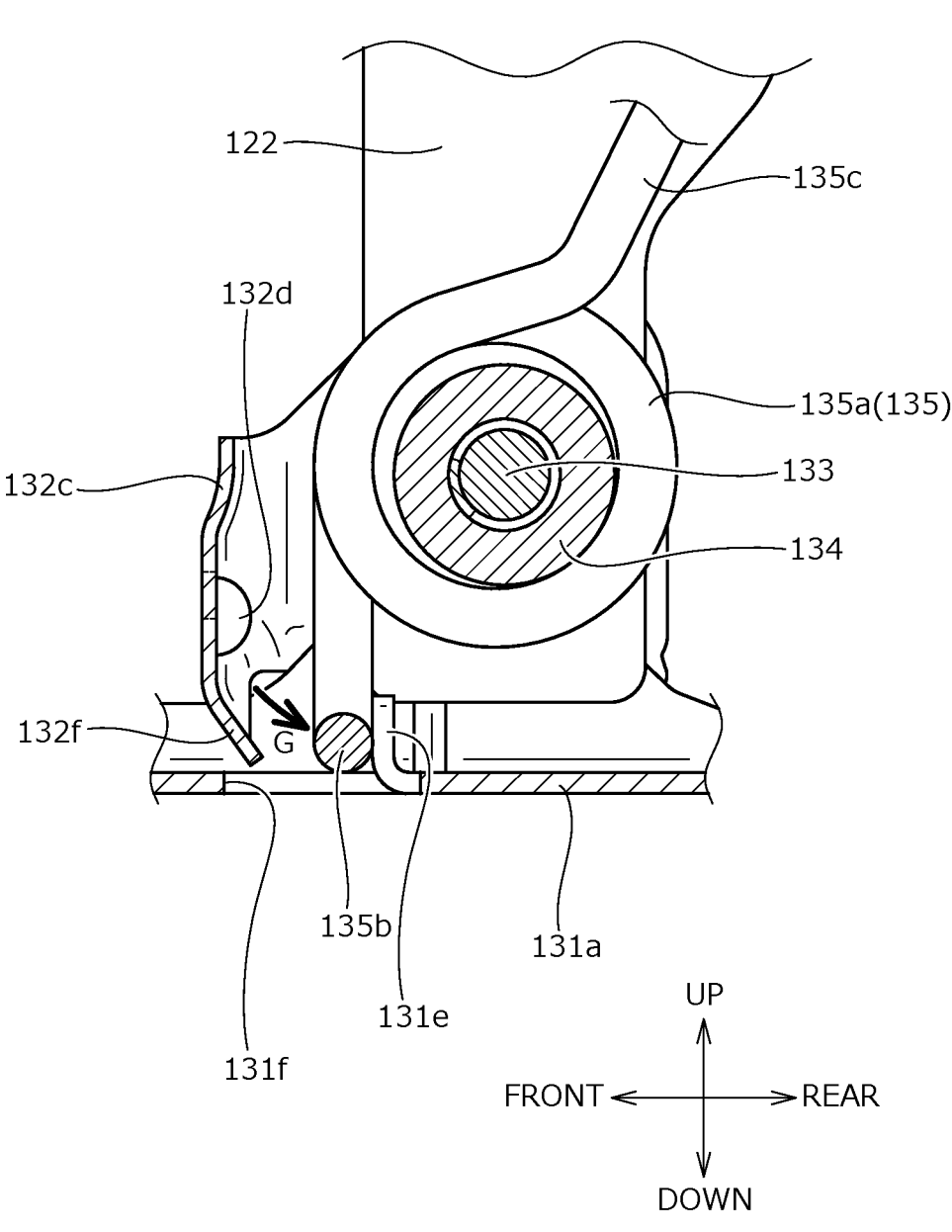
FIG. 16 is a cross-sectional view taken along a line B-B of FIG. 10 and is a view showing the hinge mechanism when the vehicle seat is in the upright state.

On the other hand, as shown in FIG. 16, when the seat body SAh is flipped up to be in the upright state, the rail support portion 135c of the coil spring 135 stands up in accordance with the rising lower rail 122. The coil spring 135 rotates around the axis of the hinge shaft 133 in the direction of the arrow G and the engagement portion 135b of the coil spring 135 engages with the fixed bracket 131. At this time, the engagement portion 135b is configured to come into contact with the first contact portion 131e, protruding from the fixed bracket 131, to stop the movement thereof.

Figure 17:
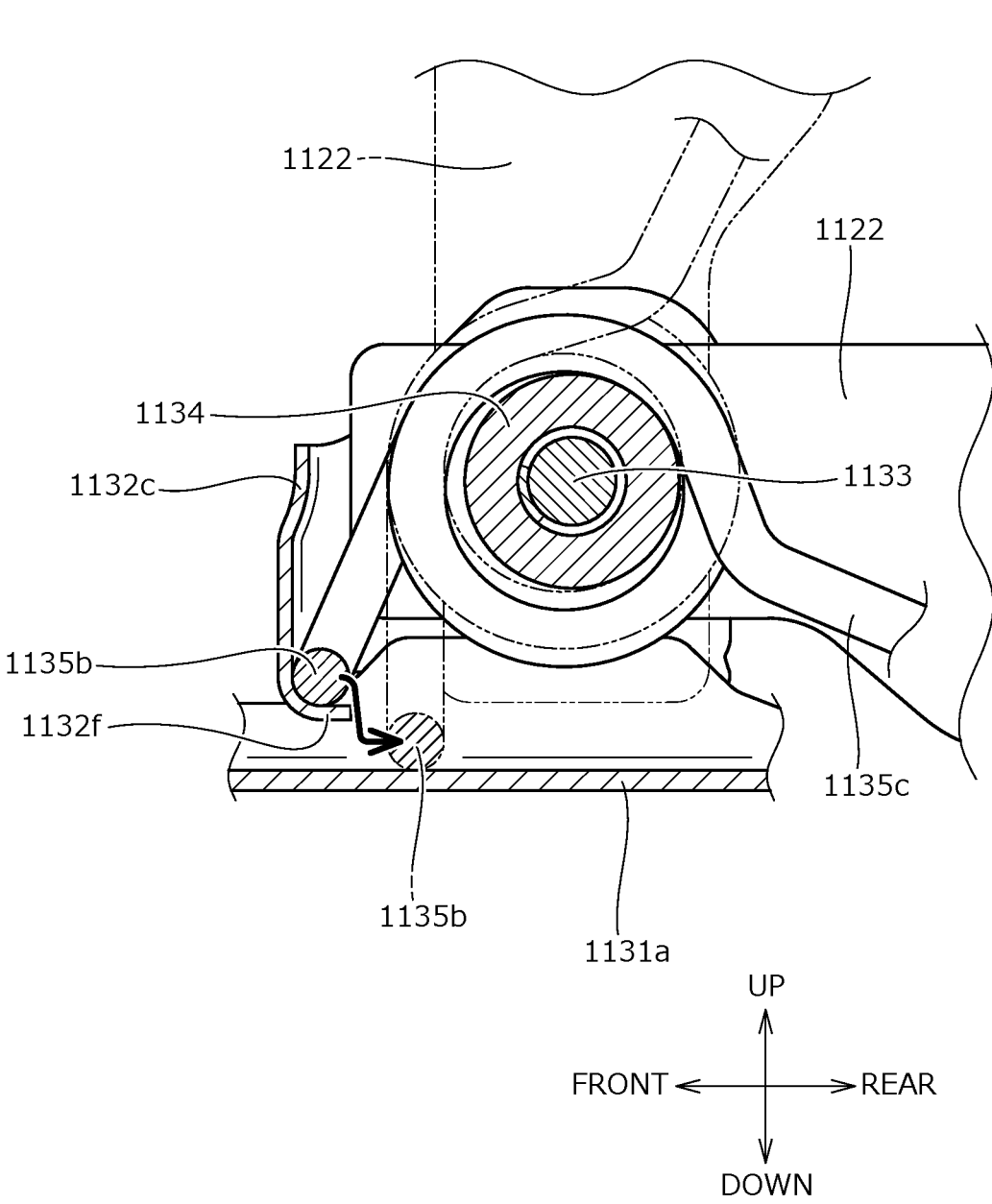
FIG. 17 is a view showing conventional hinge mechanism and is an explanatory view illustrating the hinge mechanism when the vehicle seat is in the upright state.

In a conventional hinge mechanism 1130, as shown in FIG. 17, a fixed bracket 1131 is not provided with a first contact portion which comes into contact with an engagement portion 1135b to stop the movement thereof.

Therefore, since the coil spring 1135 falls freely when the engagement portion 1135b held by a front wall portion 1132c of a shaft support member 1132 moves backward at the time of flipping up the seat body SAh, the engagement portion 1135b hits the fixed bracket 1131 to generate a collision sound (abnormal noise).

In the hinge mechanism 130 of this embodiment, since the first contact portion 131e is provided to contact the engagement portion 135b, the generation of the collision sound is suppressed by suppressing the free fall of the coil spring 135.

Further, as described above, the first contact portion 131e is integrally provided in the fixed bracket 131 by cutting and raising a part of the fixed bracket 131. Since the fixed bracket 131 and the first contact portion 131e are formed as a single component, an increase in the number of components can be suppressed.

<Second Contact Portion 132d>

Figure 13:
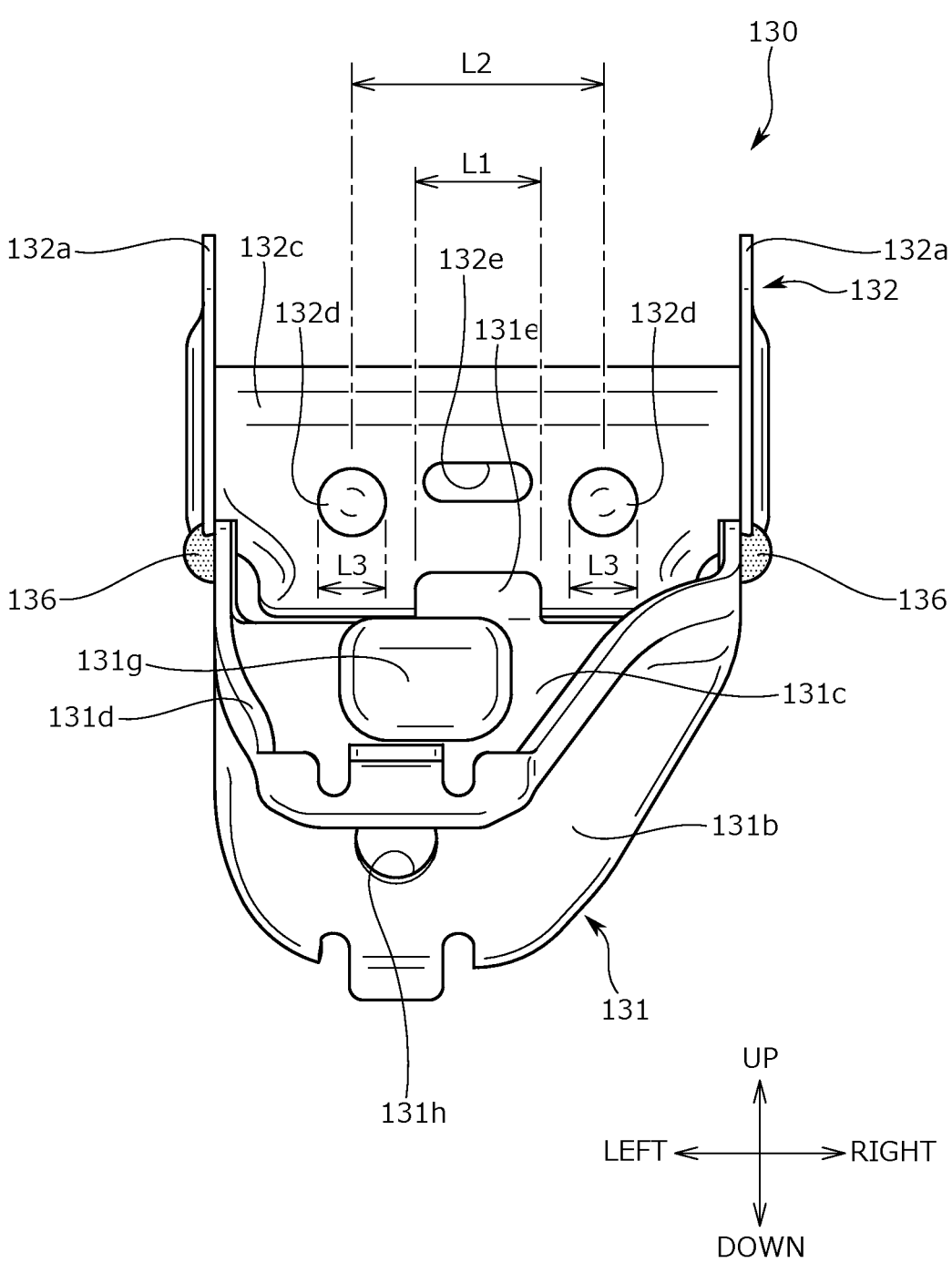
FIG. 13 is a rear view of a fixed bracket to which a shaft support member is attached.

As shown in FIGS. 13 to 15, two second contact portions 132d are formed in the front wall portion 132c of the shaft support member 132. Each of the second contact portions 132d is formed in a convex shape that protrudes backward from the front wall portion 132c, that is, toward the coil spring 135.

More specifically, the second contact portion 132d is formed into a hemispherical convex shape by embossing. Since the engagement portion 135b of the coil spring 135 comes into contact with the hemispherical surface of the second contact portion 132d, the movement of the engagement portion 135b is stopped.

As shown in FIG. 15, when the seat body SAh changes from the upright state to the forward folded state, the rail support portion 135c of the coil spring 135 is inclined backward so that the coil spring 135 rotates around the hinge shaft 133. The engagement portion 135b moves in the direction of the arrow F to come into contact with the second contact portion 132d. The engagement portion 135b comes into contact with the second contact portion 132d to stop the movement thereof.

The second contact portion 132d is integrally provided in the shaft support member 132 by embossing and the shaft support member 132 and the second contact portion 132d are formed as a single component. Therefore, the number of components does not increase. Further, since the convex shape is formed by a relatively simple method, manufacturing costs can be reduced compared to the case where the second contact portion is provided as a separate member.

Furthermore, the second contact portion 132d is formed in a hemispherical convex shape, but may be formed by cutting and raising a part of the shaft support member 132 similarly to the first contact portion 131e.

Further, as shown in FIG. 13, the second contact portion 132*d* is provided at a position away from the front wall portion 132*c* of the shaft support member 132 by a predetermined distance L2. Further, the length L3 of each second contact portion 132*d* in the seat width direction is smaller than the length L1 of the first contact portion 131*e* in the seat width direction. Since the length L3 of each second contact portion 132*d* in the seat width direction is shorter than the length L1 of the first contact portion 131*e* in the seat width direction, manufacturing costs can be reduced.

Further, two second contact portions 132*d* are arranged to avoid the center portion of the shaft support member 132 in the seat width direction. Since the second contact portions 132*d* are arranged to avoid the center portion of the shaft support member 132, the coil spring 135 is not excessively restrained and hence the stress applied to the second contact portion 32*d* can be moderated even when the coil spring 135 is deformed when torque is applied to the coil spring 135.

Furthermore, three or more second contact portions 132*d* may be provided in the shaft support member 132. Since the plurality of second contact portions 132*d* are formed in the shaft support member 132, it is possible to support the engagement portion 135*b* and more reliably stop the movement of the engagement portion 135*b*.

Further, as shown in FIG. 13, a through-hole 132*e* is formed between two second contact portions 132*d*. The through-hole 132*e* is formed into an elongated oval in the seat width direction. Since the through-hole 132*e* is provided between two second contact portions 132*d*, the weight of the shaft support member 132 can be reduced.

Further, in the shaft support member 132, a lower end 132*f* located below two second contact portions 132*d* is formed to be inclined backward as shown in FIG. 15. Since the lower end 132*f* is inclined, the shaft support member 132 does not hold the engagement portion 135*b*. Accordingly, since the coil spring 135 does not come off from the shaft support member 132 to fall freely in the upright state, it is possible to suppress the generation of the collision sound generated when the engagement portion 135*b* collides with the fixed bracket 131.

Further, as shown in FIG. 13, the first contact portion 131*e* is disposed on the fixed bracket 131 to be located between two second contact portions 132*d* arranged at a predetermined distance L2 in the seat width direction as viewed from the front side. Further, as shown in FIG. 14, the first contact portion 131*e* is disposed not to overlap the second contact portion 132*d* in the front to rear direction.

With such an arrangement, since the contact positions of the engagement portion 135*b* with respect to the first contact portion 131*e* and the second contact portion 132*d* are changed in the seat width direction and hence stress is no longer concentrated in one area. Accordingly, the durability of the coil spring 135 can be improved.

Further, as shown in FIG. 13, the second contact portion 132*d* is disposed so that the arrangement interval (a predetermined distance L2) in the seat width direction is larger than the length L1 of the first contact portion 131*e* in the seat width direction.

The area of the contact portion between each second contact portions 132*d* and the engagement portion 135*d* is small, but since the arrangement interval (predetermined distance L2) of the second contact portions 132*d* is larger than the length L1 of the first contact portion 131*e* in the seat width direction, it is possible to stably support the engagement portion 135*b* and stop the movement of the engagement portion 135*b*.

As described above, the embodiment of the present invention has been described with reference to the drawings. Furthermore, in the vehicle seat SA of this embodiment, a coil spring is used as the biasing member, but the biasing member may be a means other than the coil spring, for example, an elastically deformable member such as a leaf spring.

Third Embodiment

Hereinafter, a third embodiment according to the present invention will be described with reference to FIGS. 18 to 26.

TECHNICAL FIELD

A third embodiment of the present invention relates to a conveyance seat and particularly to a conveyance seat provided with a pressure sensor on the seat.

Conventionally, a pressure sensor is placed in a vehicle seat to detect whether an occupant is seated on the vehicle seat. Since it is possible to detect whether the occupant is seated on the vehicle seat by the pressure sensor, for example, a warning can be issued if the occupant is not wearing a seat belt even though he or she is seated on the vehicle seat.

Usually, such a pressure sensor that detects the occupant is disposed between a seat cushion pad of the vehicle seat and a skin. However, when the pressure sensor is disposed directly below the skin, the pressure sensor that senses the buttocks and thighs of the occupant seated on the vehicle seat causes a poor seating feeling in some cases.

Therefore, in the technology disclosed in JP 2019-99099 A, the seating feeling is improved by a configuration in which the pressure sensor is configured as a push switch and is disposed on a lower surface of the seat cushion pad to prevent the pressure sensor from touching the buttocks and thighs of the occupant seated on the seat through the skin.

SUMMARY OF INVENTION

Technical Problem

The push switch described in JP 2019-99099 A is embedded in a concave portion provided in a pan frame that supports the seat cushion pad. Then, the push switch is configured so that the upper end of the push switch is located substantially at the same height as the height of the pan frame around the push switch in a non-seated state. Therefore, since the pad material is supported by the pan frame around the push switch when the occupant is seated, there is a possibility that no pressure is applied to the push switch and the sensitivity deteriorates.

The present invention has been made in view of the above-described problems and an object thereof is to provide a conveyance seat having high sensitivity in detection even in a pressure sensor pressed down through a cushion pad.

Solution to Problem

The above-described problems are solved by a conveyance seat of the present invention that is a conveyance seat on which an occupant is seated including: a cushion pad which supports the buttocks of the occupant when the occupant is seated; a pressure receiving mat which is disposed below the cushion pad; and a pressure sensor which is attached to the pressure receiving mat, in which the pressure sensor is configured as a push switch and is disposed at a position in which a lower surface of the cushion pad presses down an upper end of the push switch in a pressure contact state in the pressure receiving mat, and in which the push switch is attached to the pressure receiving mat so that the upper end of the push switch is located above an upper surface of the pressure receiving mat around the push switch or located at the same height as the upper surface when the push switch is turned on by being pressed down from the lower surface of the cushion pad.

The push switch is attached so that the upper end of the push switch is located above the upper surface of the pressure receiving mat around the push switch when the push switch is turned on. Accordingly, when the occupant is seated, for example, pressure is applied to the push switch while the upper surface of the pressure receiving mat does not prevent the cushion pad from being pressed down.

Therefore, it is possible to provide the conveyance seat having high sensitivity in detection even in the pressure sensor pressed down through the cushion pad.

Further, the above-described problems are solved by a conveyance seat of the present invention that is a conveyance seat on which an occupant is seated including: a cushion pad which supports the buttocks of the occupant when the occupant is seated; a pressure receiving mat which is disposed below the cushion pad; and a pressure sensor which is attached to the pressure receiving mat, in which a ventilation groove through which air blown from a blowing device passes is formed inside the cushion pad, in which the pressure sensor is configured as a push switch and is disposed at a position in which a lower surface of the cushion pad presses down an upper end of the push switch in a pressure contact state in the pressure receiving mat, and in which the push switch is disposed at a position avoiding the ventilation groove when viewed from above the cushion pad.

If there is the ventilation groove between the buttocks of the occupant and the push switch when the occupant is seated, there is a possibility that no pressure is applied to the push switch while the pressure is absorbed by the ventilation groove. Since the push switch is disposed at a position avoiding the ventilation groove when viewed from above the cushion pad, it is possible to provide the conveyance seat having high sensitivity in detection even in the push switch pressed down through the cushion pad.

In the conveyance seat, the cushion pad may include a first pad material and a second pad material disposed on a seating surface side of the first pad material in an overlapping state, the ventilation groove may be formed between the first pad material and the second pad material in the second pad material, and the push switch may be disposed at a position avoiding the ventilation groove when viewed from above the cushion pad.

Since the cushion pad includes the first pad material and the second pad material, the ventilation groove is easily formed in the cushion.

Further, since the push switch is disposed at a position avoiding the ventilation groove, high sensitivity in detection can be obtained while no pressure is absorbed by the ventilation groove.

Further, in the conveyance seat, the first pad material may be provided with a ventilation hole which penetrates the first pad material in an up to down direction and communicates with the ventilation groove, and the push switch may be disposed at a position avoiding the ventilation hole when viewed from above the cushion pad.

Since the push switch is disposed at a position avoiding the ventilation hole, pressure is not supplied by the ventilation hole. Accordingly, it is possible to obtain high sensitivity in detection even in the pressure sensor pressed down through the cushion pad.

Further, the above-described problems are solved by a conveyance seat of the present invention that is a conveyance seat on which an occupant is seated including: a cushion pad which supports the buttocks of the occupant when the occupant is seated; a skin material which covers the cushion pad; a pressure receiving mat which is disposed below the cushion pad; and a pressure sensor which is attached to the pressure receiving mat, in which the pressure sensor is configured as a push switch and is disposed at a position in which a lower surface of the cushion pad presses down an upper end of the push switch in a pressure contact state in the pressure receiving mat, in which a hanging member for hanging the skin material onto the cushion pad is attached to the skin material at a hanging position of hanging the skin material onto the cushion pad, in which an engagement member which engages with the hanging member is attached to the cushion pad, and in which the push switch is disposed at a position avoiding the hanging member and the engagement member when viewed from above the cushion pad.

Since the push switch is disposed at a position avoiding the hanging member and the engagement member, no pressure is absorbed by the hanging member and the engagement member. Accordingly, it is possible to provide the conveyance seat having high sensitivity in detection even in the pressure sensor pressed down through the cushion pad.

Advantageous Effects of Invention

According to the present invention, it is possible to provide the conveyance seat having high sensitivity in detection even in the pressure sensor pressed down through the cushion pad.

Further, since the push switch is disposed at a position avoiding the ventilation groove when viewed from above the cushion pad, no pressure is absorbed by the ventilation groove. Accordingly, it is possible to provide the conveyance seat having high sensitivity in detection even when pressed down through the cushion pad.

Further, since the cushion pad includes the first pad material and the second pad material, the ventilation groove is easily formed in the cushion.

Further, since the push switch is disposed at a position avoiding the ventilation hole, pressure is not supplied by the ventilation hole. Accordingly, it is possible to obtain high sensitivity in detection even in the pressure sensor pressed down through the cushion pad.

Since the push switch is disposed at a position avoiding the hanging member and the engagement member, no pressure is absorbed by the hanging member and the engagement member. Accordingly, it is possible to provide the conveyance seat having high sensitivity in detection even in the push switch pressed down through the cushion pad.

DESCRIPTION OF EMBODIMENTS

Hereinafter, the configuration of the conveyance seat according to the third embodiment of the present invention will be described with reference to the drawings. However, the embodiment described below is intended to facilitate understanding of the present invention, and is not intended to limit the present invention. That is, the present invention may be modified and improved without departing from its spirit, and it goes without saying that the present invention includes equivalents thereof.

Further, in the following description, the content regarding the material, shape, and size of the components constituting the conveyance seat is only one specific example, and does not limit the present invention.

Furthermore, hereinafter, a vehicle seat mounted on a vehicle will be described as an example of the conveyance seat, and an example of its configuration will be described.

Further, in the following description, the "front to rear direction" is the front to rear direction of the conveyance seat and is the direction that matches the travel direction when the vehicle travels. Further, the "seat width direction" is the lateral width direction of the conveyance seat and is the direction that matches the right to left direction when viewed from the occupant seated on the conveyance seat. Further, the "up to down direction" is the up to down direction of the conveyance seat and is the direction that matches the vertical direction when the vehicle travels on a horizontal plane. Further, when simply referred to as the "outside", it refers to the side closer to the outside in the direction from the center of the single conveyance seat to the outside. Then, when referred to as the "inside", it refers to the side closer to the center in the direction from the outside to the center of the single conveyance seat.

Furthermore, the shape, position, posture, and the like of each part of the conveyance seat described below will be described assuming that the conveyance seat is in the seated state unless otherwise specified.

<Conveyance Seat SB>

Figure 18:
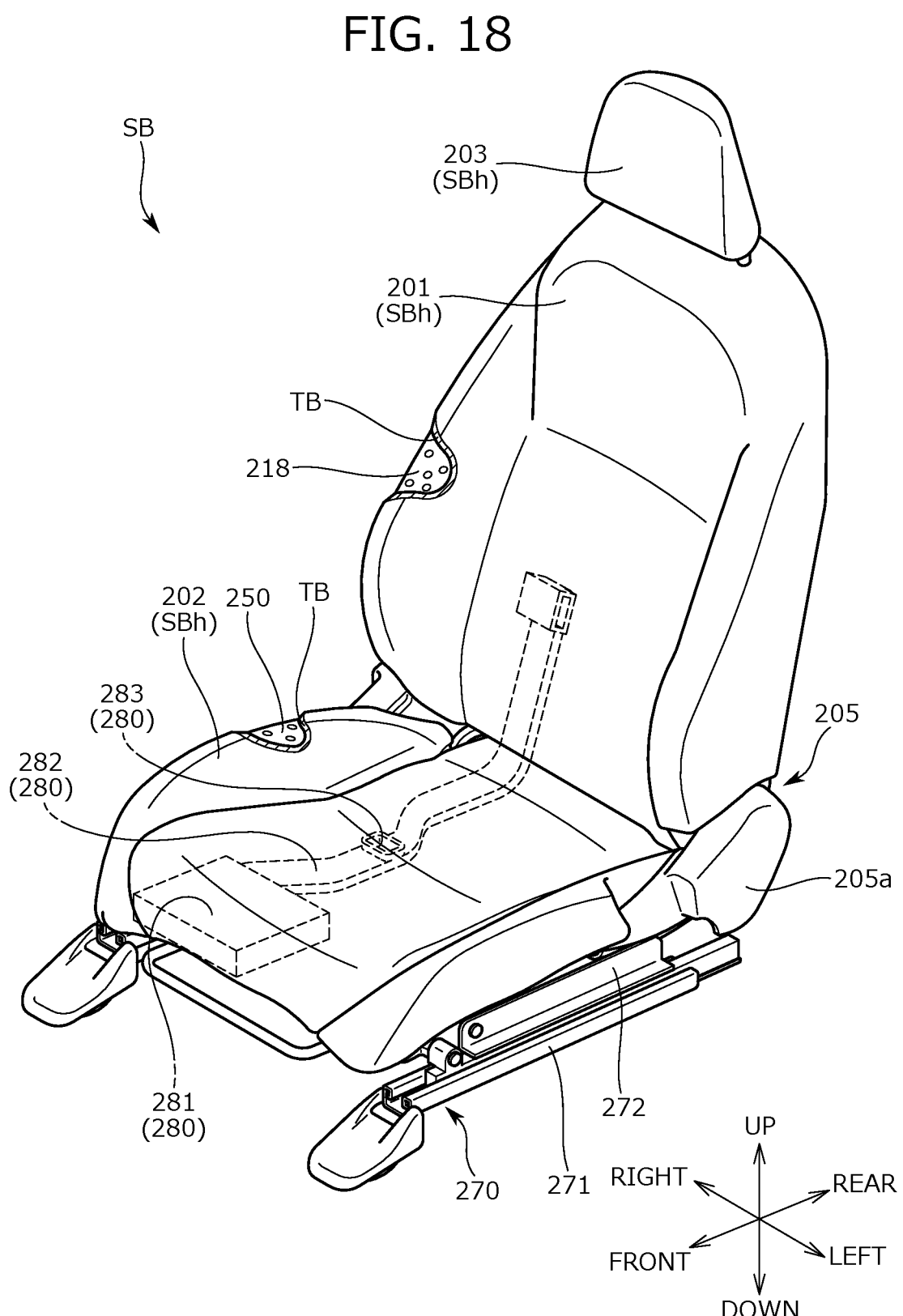
FIG. 18 is an external perspective view of a conveyance seat according to a third embodiment of the present invention.

The basic configuration of the conveyance seat (hereinafter, conveyance seat SB) according to this embodiment will be described with reference to FIG. 18. FIG. 18 is a perspective view of the conveyance seat SB and in FIG. 18, a part of the conveyance seat SB is shown with a skin material TB removed for convenience of illustration.

The conveyance seat SB is a seat which is placed on a vehicle floor and on which an occupant (seated person) of the vehicle is seated. In this embodiment, the conveyance seat SB is used as a front seat corresponding to the front seat of a vehicle. However, the present invention is not limited thereto and the conveyance seat SB may be a rear seat and can also be used as a second-row middle seat or a third-row rear seat in a vehicle that has three rows of seats in the front to rear direction.

As shown in FIG. 18, the conveyance seat SB mainly includes a seat back 201 which serves as a backrest portion that supports the back of the seated person H, a seat cushion 202 which serves as a seating portion that supports the buttocks of the seated person H, and a headrest 203 which is disposed on the upper portion of the seat back 201 and supports the head of the seated person H. Furthermore, the seat back 201, the seat cushion 202, and the headrest 203 may be collectively referred to as a seat body SBh.

<Seat Back 201>

The seat back 201 includes a seat back frame 210 to be described later, a seat back pad 218 which is provided outside the seat back frame 210, and a skin material TB which covers the seat back pad 218.

The skin material TB has a two-layer structure, and includes a front surface material made of cloth, synthetic leather, genuine leather, or the like and a back surface material made of a sponge shaped wadding material disposed on the back surface side.

The seat back pad 218 is a pad member, and is, for example, a urethane base material formed by foam molding using a urethane foam material.

<Seat Cushion 202>

The seat cushion 202 includes a seat cushion frame 220 to be described later, a cushion pad 250 which is provided outside the seat cushion frame 220, and a skin material TB which covers the cushion pad 250.

The skin material TB of the seat cushion 202 has a two-layer structure similar to the skin material TB used for the seat back 201 and includes a front surface material made of cloth, synthetic leather, genuine leather, or the like and a back surface material made of a sponge shaped wadding material disposed on the back surface side.

Further, the skin material TB is made of a material with high air permeability and can send air blown out from a blowing port 255 of the cushion pad 250 to be described later to the seating side surface. Furthermore, when the front surface material of the skin material TB is made of a material with low air permeability, a hole for passing air may be formed in the skin material TB at a position corresponding to the blowing port 255.

Figure 22:
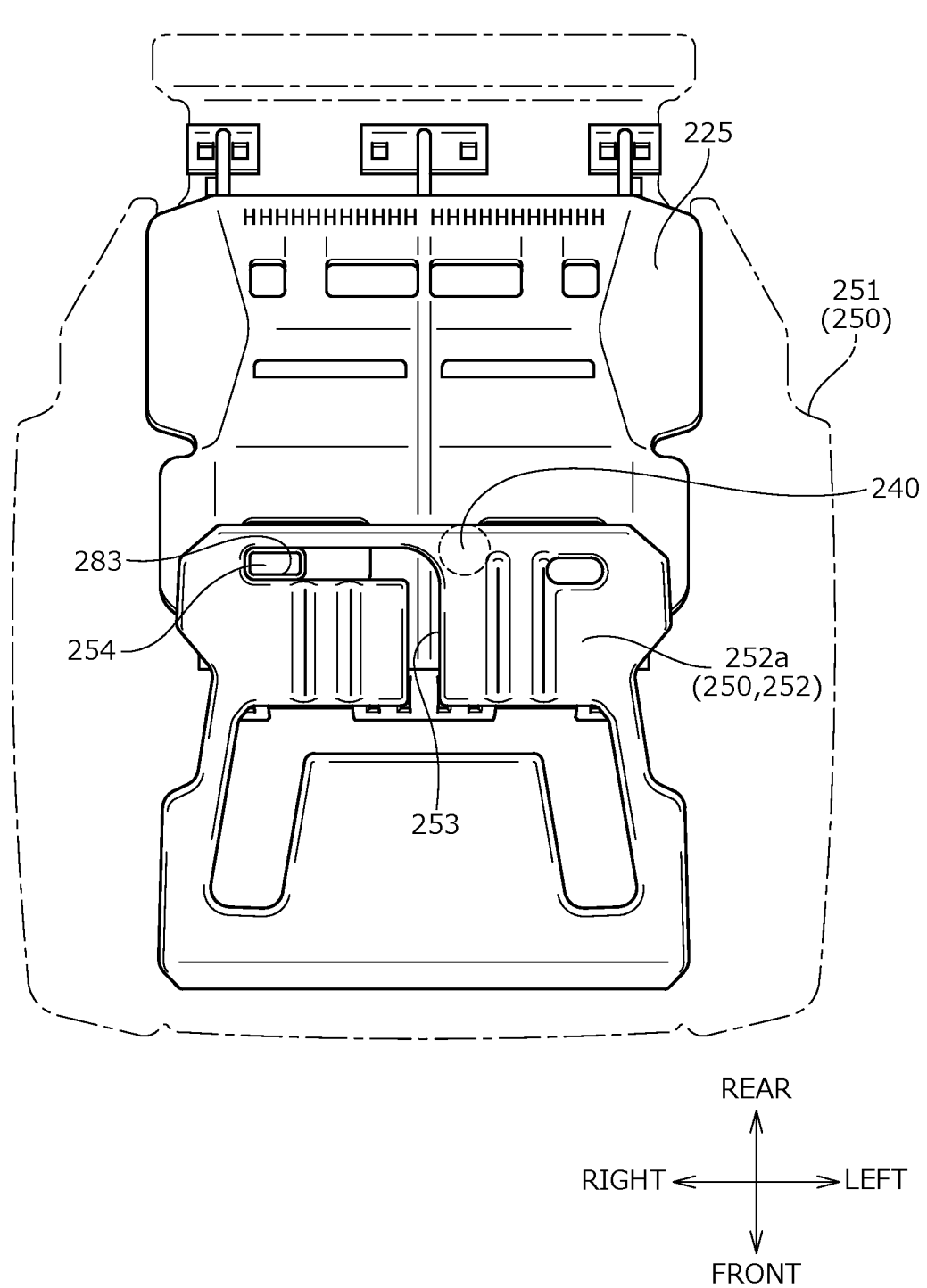
FIG. 22 is a plan view showing a second pad material of a cushion pad and is an explanatory diagram showing a positional relationship between a ventilation groove of the second pad material and the push switch.
Figure 23:
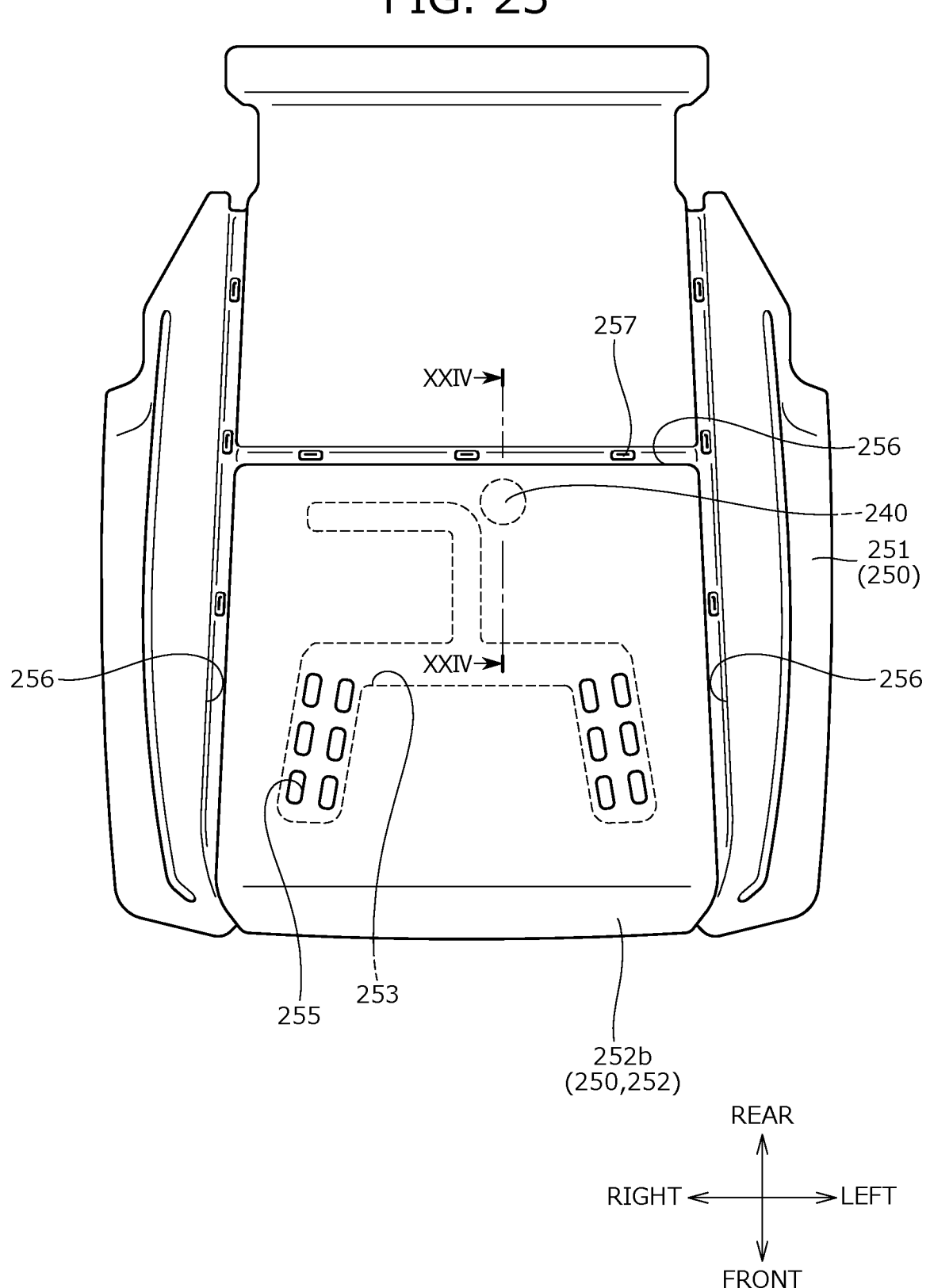
FIG. 23 is an explanatory diagram showing a positional relationship between a locking member of a hanging groove provided in the cushion pad and the push switch.

As shown in FIGS. 22 and 23, the cushion pad 250 provided outside the seat cushion frame 220 has a two-layer structure and includes a first pad material 251 which serves as a body and a second pad material 252 which is provided to overlap on the surface on the seated person side of the first pad material 251. Further, the second pad material 252 further includes a lower member 252a and an upper member 252b which is provided to overlap on the lower member 252a. Then, as shown in FIG. 22, a ventilation groove 253 is formed on the lower member 252a. The ventilation groove 253 has a ventilation hole 254 formed at the end to extend in the up to down direction and communicates with a blowout portion 283 formed in a duct 282 of a blowing device 280 to be described later.

As shown in FIG. 23, a hanging groove 256 for hanging the skin material TB is provided at a position for hanging the skin material TB in the seating surface of the cushion pad 250. Further, an engagement member 257 for fixing the hanging member 232 provided in the skin material TB is provided at a plurality of positions of the groove bottom of the hanging groove 256.

Further, the blowing port 255 is formed on the seating surface of the cushion pad 250 (more specifically, the second pad material 252) along the ventilation groove 253 and can blow the air sent out from the blowing device 280 from the blowing port 255.

Furthermore, in this embodiment, the blowing device 280 is provided and is configured to blow air from the blowing port 255 through ventilation groove 253 of the seat cushion 202, but the blowing device 280 and the ventilation groove 253 may not be essentially provided.

<Seat Frame FB>

Figure 19:
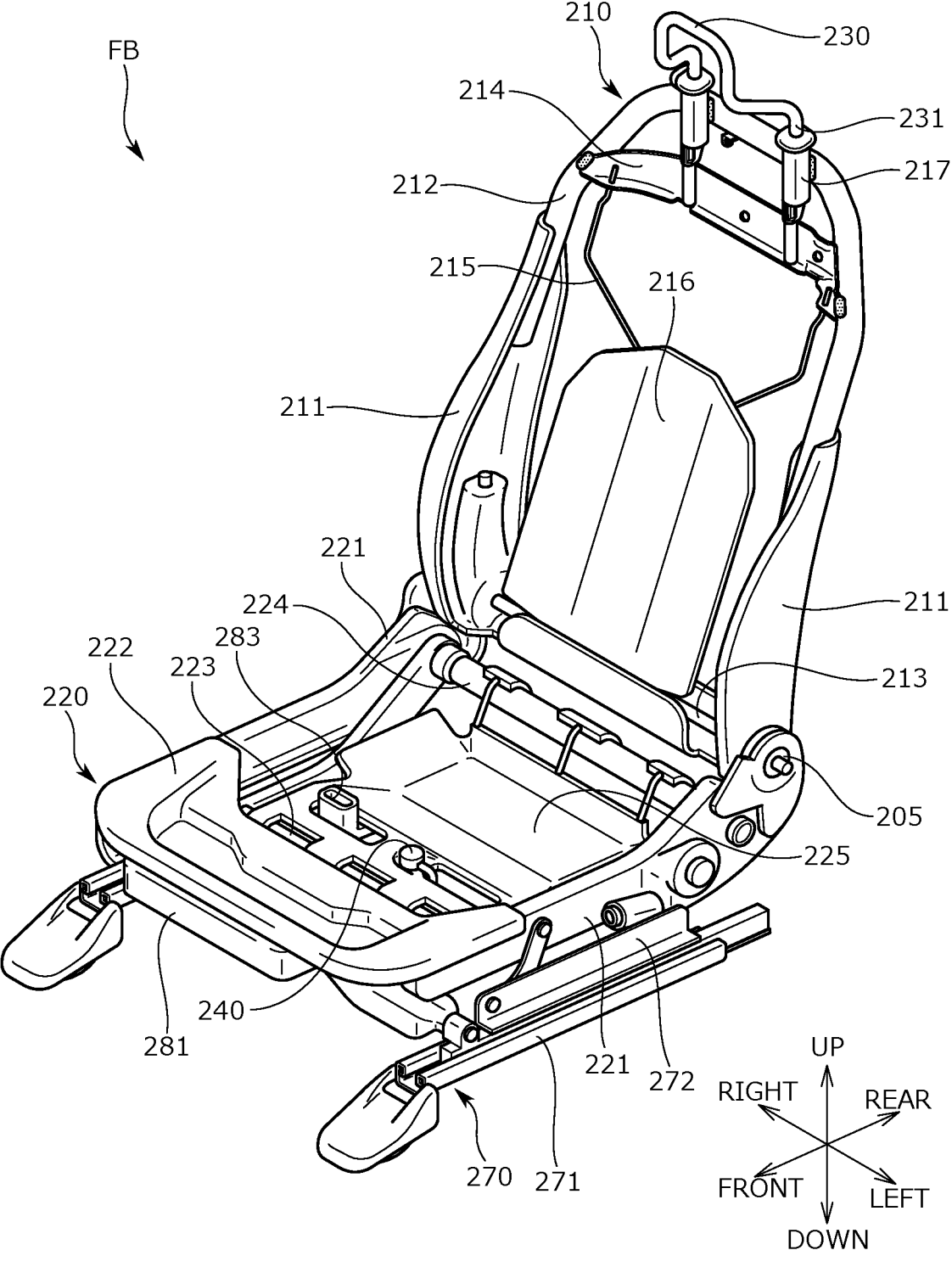
FIG. 19 is a perspective view showing a frame of the conveyance seat.

As shown in FIG. 19, a seat frame FB is provided inside the conveyance seat SB. The seat frame FB mainly includes the seat back frame 210 which forms a skeleton of the seat back 201 and the seat cushion frame 220 which forms a skeleton of the seat cushion 202.

<Seat Back Frame 210>

As shown in FIG. 19, the seat back frame 210 has a rectangular frame shape as a whole and the seat back frame 210 includes a pair of backside frames 211 and 211 which are arranged on the right and left sides, an upper frame 212, and a lower frame 213. The upper frame 212 is disposed between the pair of backside frames 211 and 211 and connects the upper ends of the pair of backside frames 211 and 211. The lower frame 213 is disposed between the pair of backside frames 211 and 211 and connects the lower ends of the pair of backside frames 211. Further, a connection frame 214 is interposed between both right and left ends of the upper frame 212 on the upper side of the seat back frame 210.

A pressure receiving member 216 is disposed below the connection frame 214. The pressure receiving member 216 is connected to the connection frame 214 through the wire member 215. The pressure receiving member 216 is a flexible plate member and supports the back of the seated person from behind. The pressure receiving member 216 is made of resin, but the present invention is not limited thereto. The pressure receiving member 216 may be made of metal.

The upper frame 212 is provided with a pillar support portion 217 through which a headrest stay 231 of the headrest 203 is inserted. The pillar support portion 217 is formed as a high-strength metal member in order to maintain the holding strength of the headrest 203 and suppress rattling. Furthermore, the pillar support portion 217 is not limited to metal and may be made of resin.

As described above, the pair of backside frames 211 and 211 are arranged on the right and left sides of the seat back frame 210 and are basically symmetrical members. The pair of backside frames 211 and 211 are members that extend in the up to down direction of the seat and are formed so that the width of each of the pair of backside frames 211 and 211 in the front to rear direction of the seat increases as it goes from above the seat toward below the seat.

<Seat Cushion Frame 220>

As shown in FIG. 19, the seat cushion frame 220 is formed into a rectangular frame shape when viewed from below and a pair of cushion side frames 221 and 221 are provided on the right and left sides. The pair of cushion side frames 221 and 221 are members extending in the front to rear direction of the seat, and are basically configured to be symmetrical. The pair of cushion side frames 221 and 221 are separated from each other in the right to left direction to define the width of the seat cushion frame 220.

Further, the seat cushion frame 220 includes a pan frame 222 which is located at the front end of the seat cushion frame 220, a front connection frame 223 which is connected on the front side of the pair of cushion side frames 221 and 221, and a rear connection frame 224 which is connected at the rear ends. The front connection frame 223 and the rear connection frame 224 are configured as round pipes. Further, a pressure receiving mat 225 which supports the buttocks of the seated person H is provided.

The pan frame 222 is mainly for supporting the thighs of the seated person H (occupant) and is a frame made of a metal plate. The pan frame 222 is fixed and joined to the front sides of the right and left cushion side frames 221 and the right and left cushion side frames 221 are connected on the front side by the pan frame 222.

The front end of the pressure receiving mat 225 is locked to the front connection frame 223 and the rear end thereof is locked to the rear connection frame 224. The pressure receiving mat 225 is a flexible plate member and can support the seated person by receiving the load of the seated person from below. The pressure receiving mat 225 is made of resin, but the present invention is not limited thereto. The pressure receiving mat 225 may be made of metal.

A plurality of iron wires are arranged on the pressure receiving mat 225 to extend in the front to rear direction of the seat. The wire is embedded in the pressure receiving mat

225 and is formed integrally with the pressure-receiving mat 225 to reinforce the pressure receiving mat 225.

Further, a push switch 240 which is a pressure sensor is fixed to an attachment portion 226 formed in the pressure receiving mat 225 and a cover 241 of the push switch 240 to be pressed down is disposed on the side of an upper surface 225*a* of the pressure receiving mat 225.

<Headrest 203>

The headrest 203 is attached to the upper portion of the seat back 201 to support the head of the seated person. A headrest frame 230 which forms a skeleton of the headrest 203 is provided inside the headrest 203 and two headrest stays 231 (called headrest pillars) that hang down from the lower portion of the headrest 203 are provided at both right and left ends of the headrest frame 230. The headrest stay 231 is inserted through the pillar support portion 217 attached to the upper frame 212 of the seat back frame 210 so that the headrest 203 is attached to the seat back frame 210.

<Reclining Device 205>

The seat back 201 and the seat cushion 202 are connected to sandwich the reclining device 205 (see FIG. 19). More specifically, the seat back frame 210 and the seat cushion frame 220 are connected to each other through the reclining device 205. The reclining device 205 has a known configuration and supports the seat back 201 to be rotatable with respect to the seat cushion 202. The seat back 201 is rotatable with respect to the seat cushion 202 by the reclining device 205 so that the inclination angle is adjustable. Further, the reclining device 205 is covered with a resinous reclining device cover 205*a* at both ends in the seat width direction.

<Rail Device 270>

The conveyance seat SB includes a rail device 270 which supports the seat body SBh to be movable in the front to rear direction with respect to the vehicle floor.

The rail device 270 is a device for sliding the seat body SBh in the front to rear direction and has a known structure (a structure of a general rail device). The rail device 270 includes a lower rail 271 which is fixed onto the vehicle floor and an upper rail 272 which is slidable with respect to the lower rail 271.

<Blowing Device 280>

The blowing device 280 which sends air to the seat cushion 202 will be described with reference to FIG. 18. The blowing device 280 is disposed from below the seat cushion 202 to behind the seat back 201 as indicated by the dotted line in FIG. 18. The blowing device 280 includes a blower 281, a duct 282, and the blowout portion 283 formed in the duct 282.

The blower 281 is a propeller fan that has rotating blades (not shown) and generates airflow by rotating the rotating blades. When the rotating blades arranged inside the blower 281 rotate, air is sucked up from below, and an airflow generated by the centrifugal force of the rotating blades flows into the duct 282 and is sent out toward the blowout portion 283.

The blower 281 is fixed to the lower surface of the pan frame 222 by an attachment bracket (see FIG. 19). The blower 281 may be a sirocco fan or a turbo fan.

The duct 282 is a hollow member that sends air blown out from the blower 281 toward the seat cushion 202 and the seat back 201 and blows air from the blowout portion 283 provided with the duct 282 to the ventilation hole 254 and the ventilation groove 253 of the cushion pad 250.

<Push Switch 240>

The configuration of the push switch 240 provided as the pressure sensor and used in this embodiment will be described. The pressure sensor is a sensor that detects the seating pressure applied to the seating surface of the seat cushion 202, and can be turned on or off depending on the seating pressure. In this embodiment, the pressure sensor is of a push switch type.

Figure 21A:
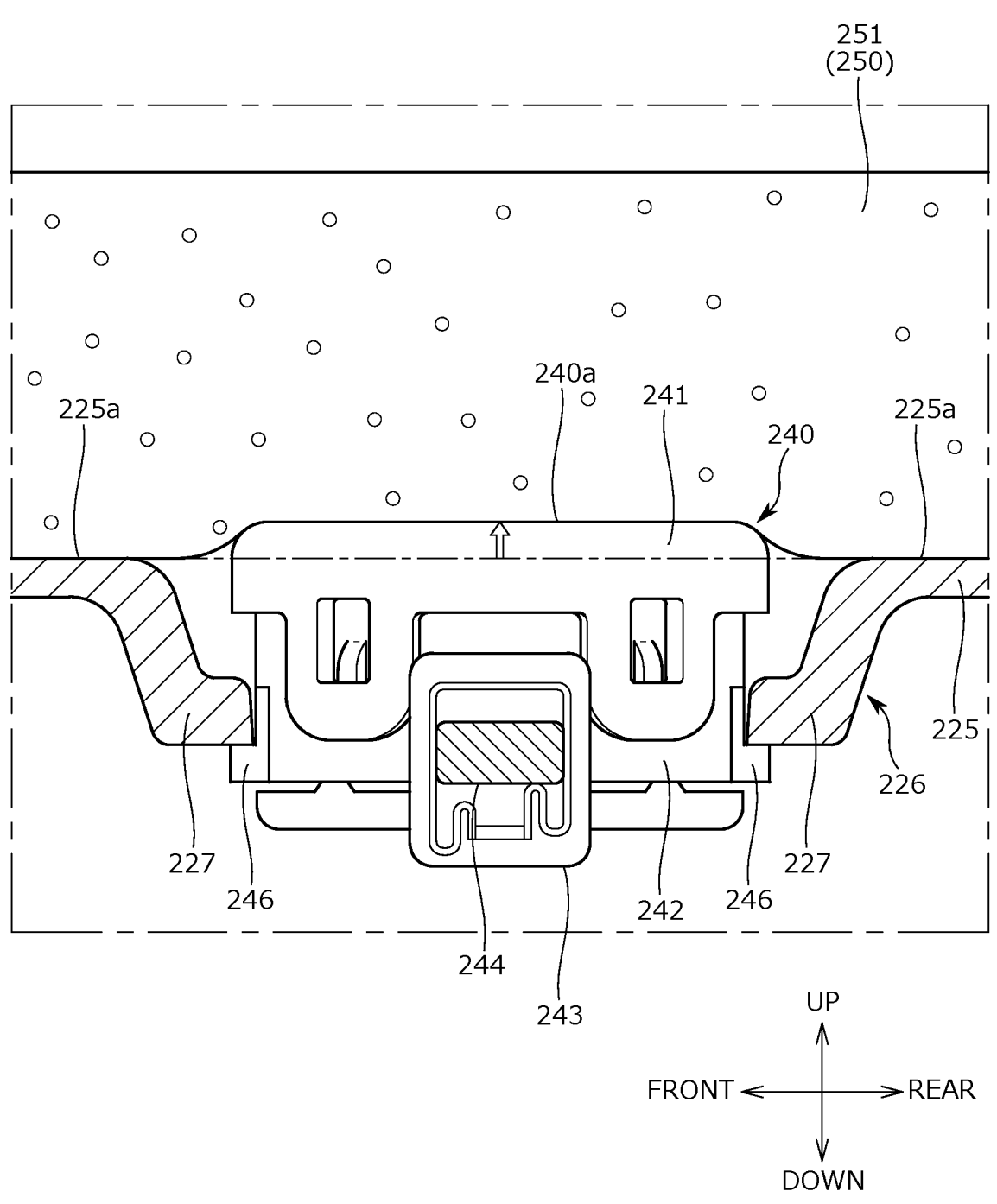
FIG. 21A is a side view showing the push switch when a pressure is not applied.

As shown in FIG. 21A, the push switch 240 includes the cover 241 and a casing body 242 and a contact or coil spring is embedded in the casing body 242. The cover 241 is movable in the up to down direction with respect to the casing body 242. The push switch 240 is configured to be turned on when the cover 241 is pressed down through the cushion pad 250 when the occupant is seated and to detect whether the occupant is seated on the conveyance seat SB.

A harness 244 is connected to the push switch 240 to electrically connect the push switch 240 to an external device (for example, a power source or a device that processes signals such as an ECU). The push switch 240 is provided with a connector 243 for connecting to the harness 244.

Figure 25A:
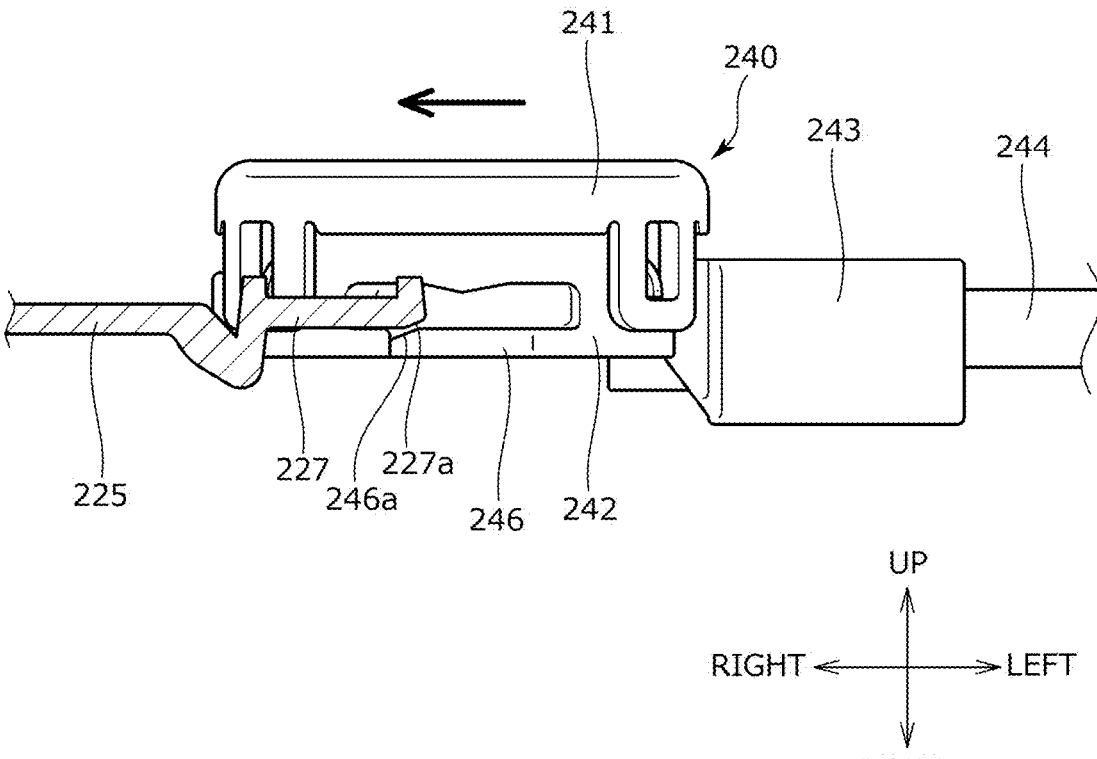
FIG. 25A is a cross-sectional view taken along a line XXV-XXV of FIG. 20 and is a view showing a state immediately before the push switch is attached to the pressure receiving mat.
Figure 25B:
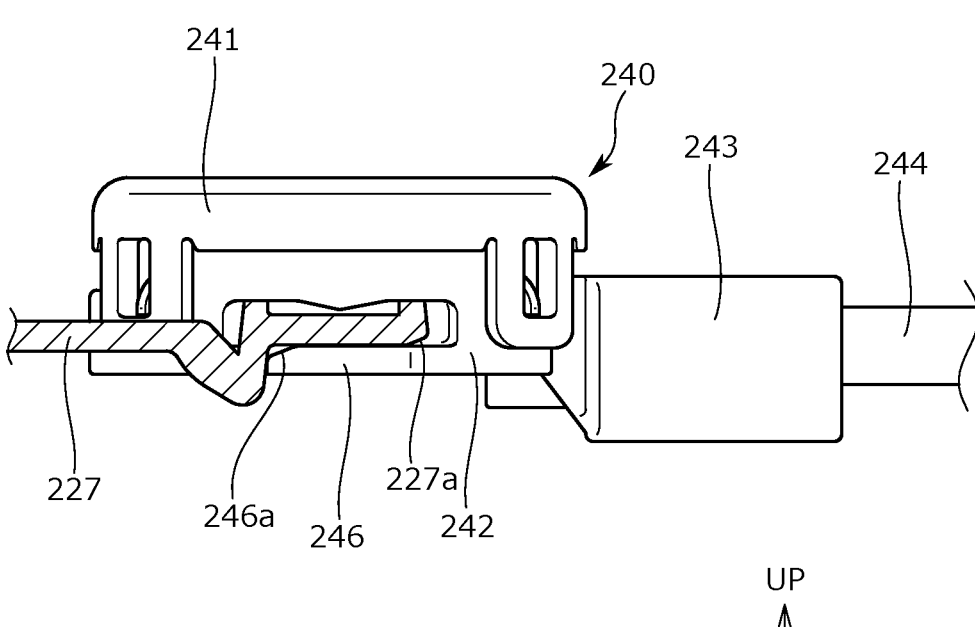
FIG. 25B is a view showing a state in which the push switch is attached to the pressure receiving mat.
Figure 25B:
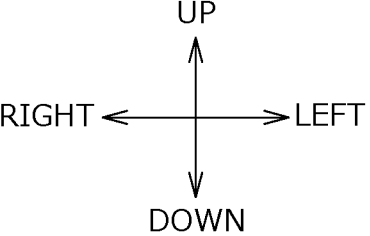

As described above, the push switch 240 is provided on the side of the upper surface 225a of the pressure receiving mat 225 and is attached and fixed to the attachment portion 226. The push switch 240 is provided with a fixing claw 246 which engages with an engagement piece 227 of the attachment portion 226. As shown in FIGS. 25A and 25B, a taper 246a is provided at the tip of the fixing claw 246. Further, a taper 227a is also provided at the tip of the engagement piece 227 of the attachment portion 226 and the fixing claw 246 is easily inserted below the engagement piece 227 of the attachment portion 226.

Figure 20:
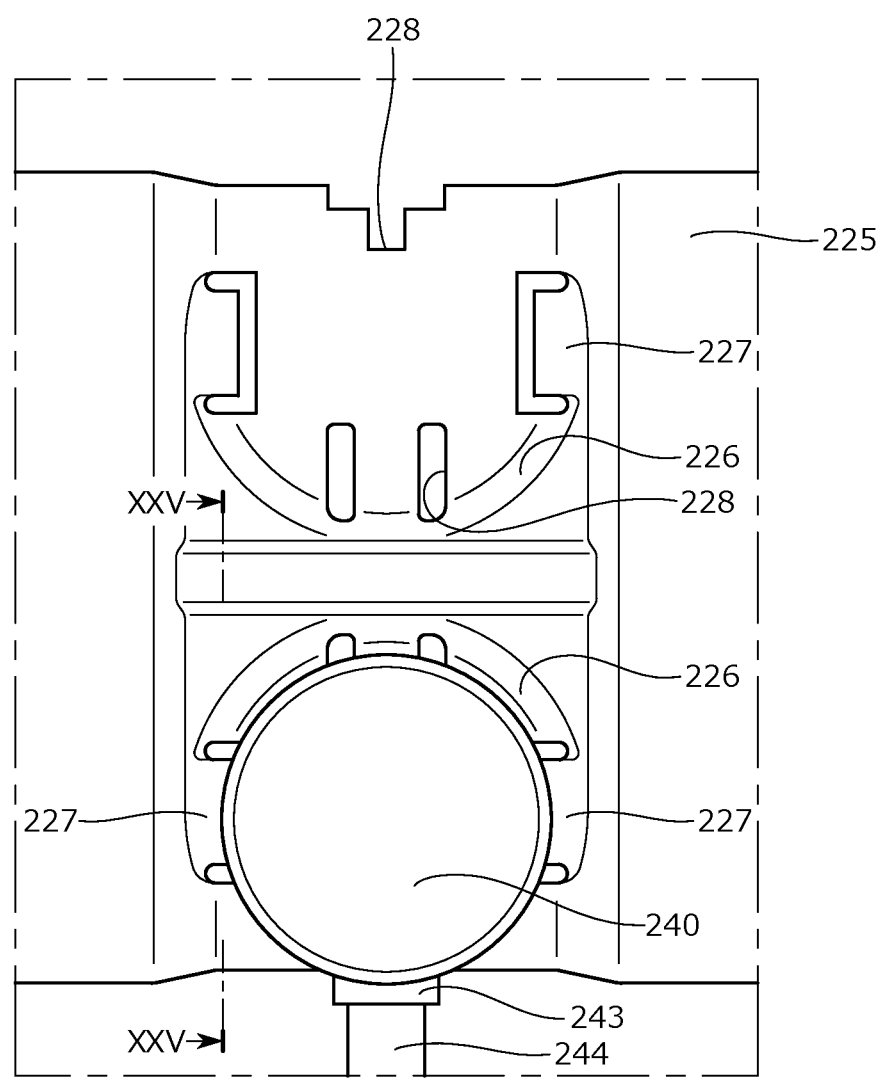
FIG. 20 is a plan view showing a push switch attached to a pressure receiving mat.
Figure 20:
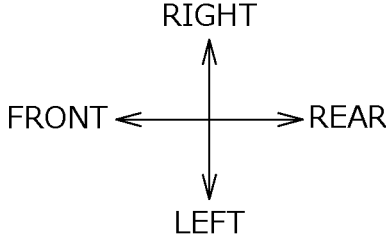

Furthermore, the push switch 240 shown in FIG. 20 has a circular shape when viewed from above, but the push switch 240 may have a rectangular shape and is not particularly limited. Further, although an example in which one push switch 240 is provided in the pressure receiving mat 225 will be described below, two or more push switches 240 may be attached to the pressure receiving mat 225.

Figure 21B:
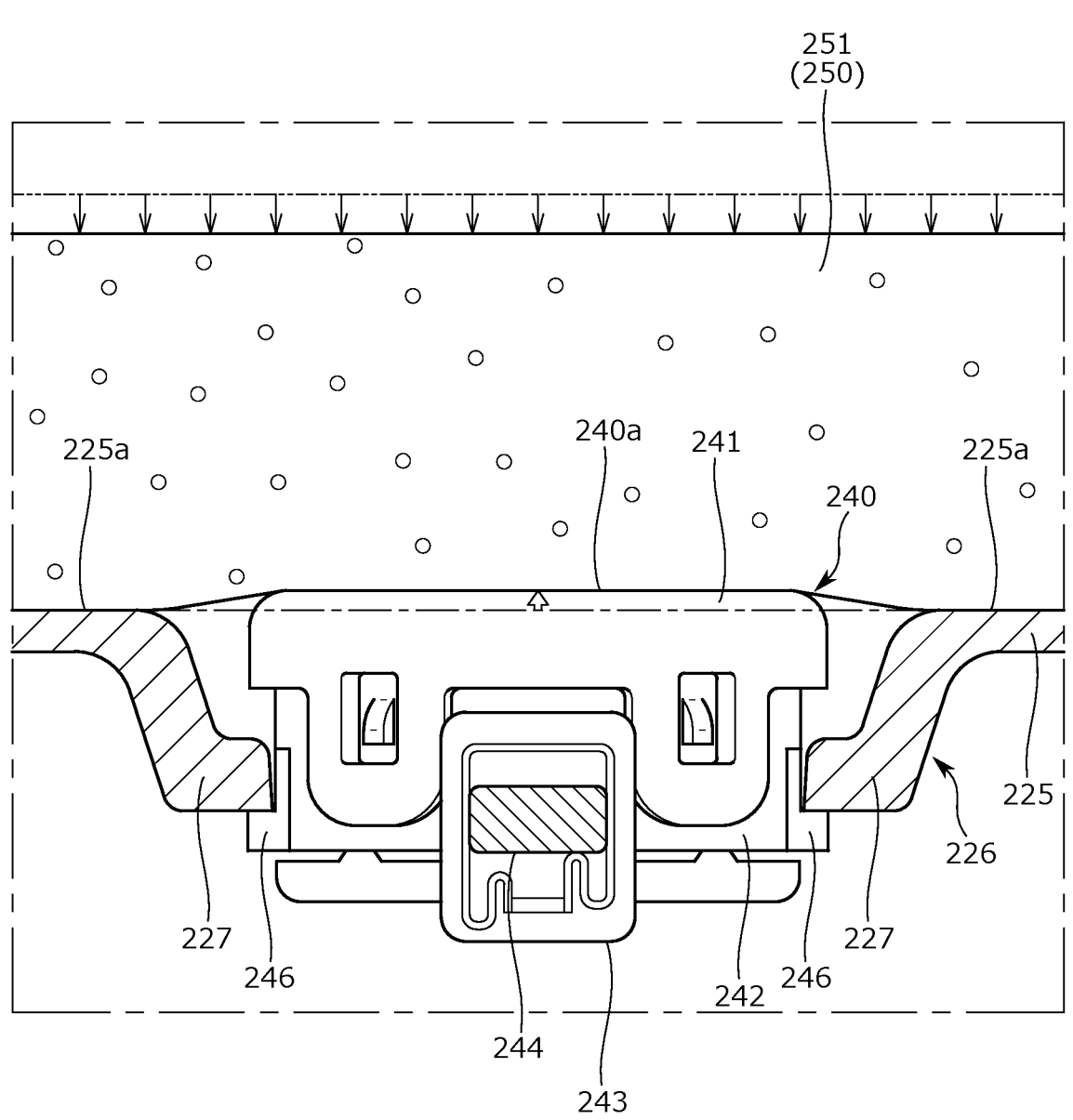
FIG. 21B is a side view showing the push switch which is turned on due to the applied pressure.
Figure 21C:
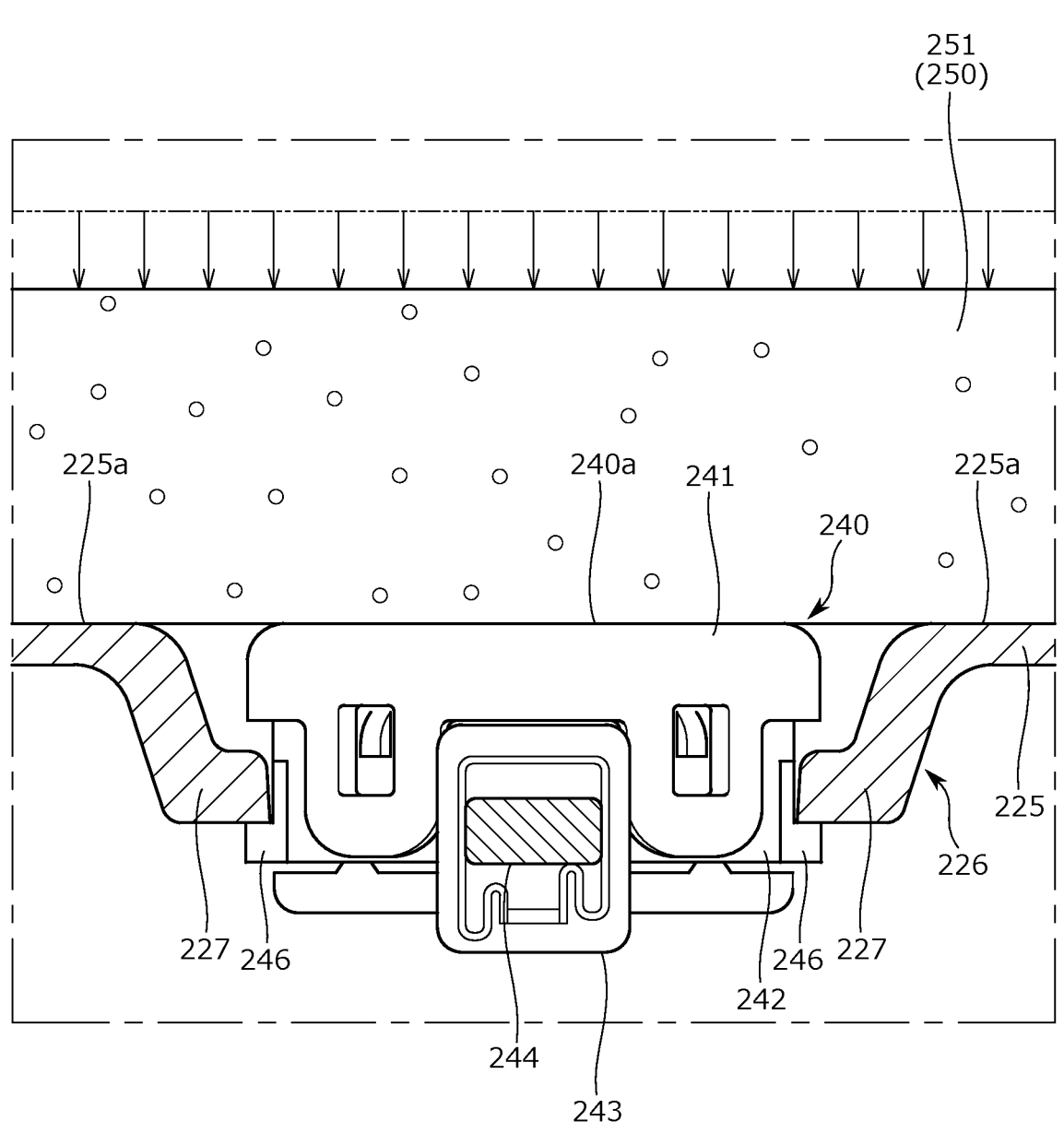
FIG. 21C is a side view showing the push switch in a fully pressed state.

A state in which the push switch 240 is attached to the pressure receiving mat 225 will be described with reference to FIGS. 20 to 21C. FIG. 20 is a plan view showing the push switch 240 attached to the pressure receiving mat 225. FIG. 21A is a view showing a state in which the pressure receiving mat 225 is attached to the attachment portion 226 and is a side view showing the push switch in a state in which no pressure is applied (an off state). FIG. 21B is a side view showing the push switch which is turned on due to the applied pressure. FIG. 21C is a view showing a state in which the cover 241 of the push switch 240 is completely pressed down.

As shown in FIG. 20, the push switch 240 is attached to the attachment portion 226 of the pressure receiving mat 225. The pressure receiving mat 225 is provided with the pair of attachment portions 226 to be symmetrical, but in this embodiment, the push switch 240 is attached to the attachment portion 226 disposed on the left side in the seat width direction. The push switch 240 may be provided on either attachment portion 226 or may be attached to both attachment portions 226.

As shown in FIG. 21A, the attachment portion 226 is formed in a concave shape recessed downward, and the push switch 240 which is a pressure sensor is attached to fit within the concave portion of the attachment portion 226.

<Upper End of Push Switch 240>

As shown in FIG. 21A, the push switch 240 is disposed at a position in which the lower surface of the cushion pad 250 can be pressed down while being pressed against an upper end 240a of the push switch 240 (more specifically, the upper surface of the cover 241).

Then, when the occupant is not seated and no pressure is applied to the cushion pad 250, that is, the push switch 240 is in an off state, the push switch 240 is attached so that the upper end 240a of the push switch 240 is located above the upper surface 225a of the pressure receiving mat 225 around the push switch 240.

Furthermore, as shown in FIG. 21B, the push switch 240 is attached so that the upper end 240a of the push switch 240 is located slightly above the upper surface 225a of the pressure receiving mat 225 even when the occupant is seated and a pressure is applied to the cushion pad 250 so that the push switch 240 is turned on.

Further, as shown in FIG. 21C, the push switch 240 is attached so that the upper end 240a of the push switch 240 and the upper surface 225a of the pressure receiving mat 225 around the push switch 240 are located substantially at the same height even when a further pressure is applied to be in a completely pressed state. The position of the push switch 240 is adjusted by the depth of the concave portion of the attachment portion 226 formed in the pressure receiving mat 225.

Conventionally, the push switch is attached so that the upper end 240a of the push switch 240 is located substantially at the same height as the upper surface 225a of the pressure receiving mat 225 when no pressure is applied to the cushion pad 250. Therefore, when a pressure is applied to the cushion pad 250 so that the cover 241 of the push switch 240 is pressed down, the cushion pad 250 needs to enter the concave portion of the attachment portion 226 against the pressure receiving mat 225 around the push switch 240. Therefore, if the pressure is not sufficient, there is a possibility that the push switch 240 will not be turned on.

As in this embodiment, since the upper end 240a of the push switch 240 is located above the upper surface 225a of the pressure receiving mat 225 around the push switch, and the upper end 240a is located above the upper surface or at the same height as the upper surface even in an on state, the pressing down of the cushion pad 250 is not obstructed by the upper surface 225a of the pressure receiving mat 225. A pressure is easily applied to the cushion pad 250 and the press-contacting cover 241 can be easily pressed down to turn on the push switch 240. Therefore, the push switch 240 can detect the seating with high sensitivity even through the cushion pad 250.

<Positional Relationship Between Push Switch 240 and Ventilation Groove 253 and the Like>

As shown in FIG. 22, the push switch 240 may be disposed at a position avoiding the ventilation groove 253 formed in the second pad material 252 of the cushion pad 250 (the lower member 252a) when viewed from above. It is preferable to arrange the push switch 240 and the ventilation groove 253 to be away from each other by a predetermined distance.

Further, the push switch 240 may be disposed at a position avoiding the ventilation hole 254 formed in the up to down direction of the first pad material 251.

When the ventilation groove 253 or the ventilation hole 254 is provided between the seating surface of the cushion pad 250 and the push switch 240, the pressure applied to the cushion pad 250 is absorbed and reduced by the ventilation groove 253 or the ventilation hole 254. Accordingly, since no pressure is applied to the push switch 240, there is a possibility that the push switch 240 is not normally pressed down. Therefore, since the push switch 240 is disposed to avoid the ventilation groove 253 or the ventilation hole 254 when viewed from above the cushion pad 250, a seating pressure is applied from the cushion pad 250 to the push switch 240 and hence the seating can be detected with high sensitivity.

<Positional Relationship Between Push Switch 240 and Hanging Member 232 and the Like>

As described above, the hanging groove 256 for hanging the skin material TB is formed in the cushion pad 250.

Figure 24:
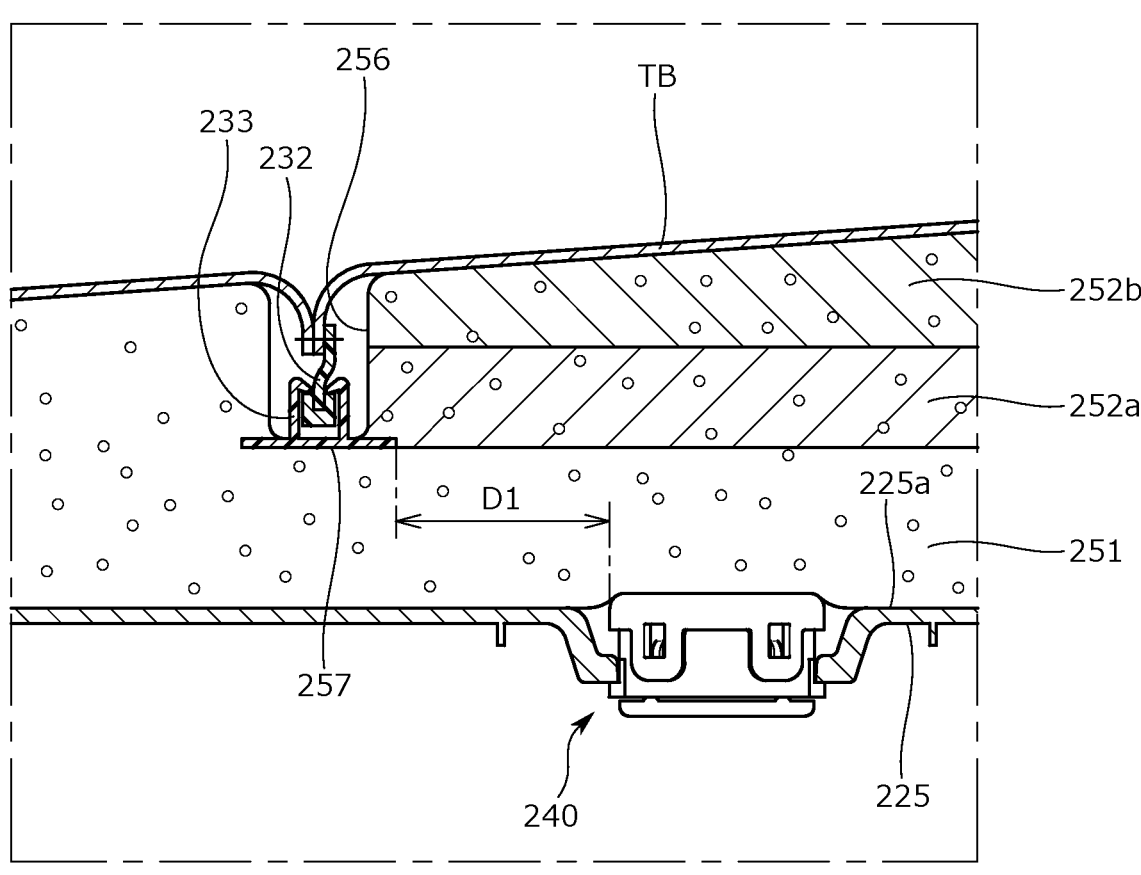
FIG. 24 is a cross-sectional view taken along a line XXIV-XXIV of FIG. 23 and is a view showing a positional relationship between the locking member of the hanging groove and the push switch.
Figure 24:
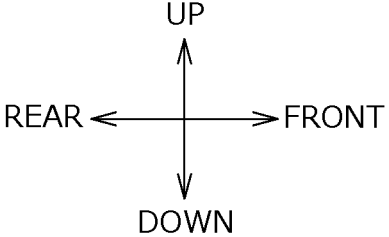

As shown in FIG. 24, the skin material TB is formed by sewing a plurality of skin pieces together and the hanging member 232 is attached to a sewn portion. The tip of the hanging member 232 is provided with a bulging locking portion 233. The engagement member 257 that engages with the locking portion 233 of the hanging member 232 is fixed to the bottom portion of the hanging groove 256 and hence the hanging member 232 can be attached to the engagement member 257 with one touch.

An attachment piece is provided at the lower end of the engagement member 257 to protrude outward and the attachment piece is embedded in the cushion pad 250 so that the engagement member 257 can be fixed to the bottom portion of the hanging groove 256.

In this embodiment, as shown in FIG. 23, the seating surface of the first pad material 251 is provided with the hanging groove 256 which extends in the right to left direction and two hanging grooves 256 which extend in the front to rear direction. Furthermore, the arrangement of the hanging groove 256 is not limited thereto and, for example, two or more hanging grooves 256 extending in the right to left direction may be provided.

As shown in FIGS. 23 and 24, the push switch 240 of this embodiment is disposed at a position avoiding the hanging member 232 and the engagement member 257 when viewed from above the cushion pad 250.

Specifically, the push switch 240 is disposed at a position away from the end of the engagement member 257 by a predetermined distance D1 in the front to rear direction. Further, the push switch 240 is disposed at a position shifted from the hanging member 232 and the engagement member 257 even in the seat width direction.

When the push switch 240 is disposed below the hanging member 232 and the engagement member 257, the cushion pad 250 is supported by the hanging member 232 and the engagement member 257 when the occupant is seated. Accordingly, there is a possibility that a pressure is not normally transmitted to the push switch 240. Since the push switch 240 is disposed at a position avoiding the hanging member 232 and the engagement member 257 when viewed from above the cushion pad 250, a pressure is normally applied to the push switch 240 and hence malfunctions of the push switch 240 can be suppressed.

<Attachment to Attachment Portion 226>

The push switch 240 of this embodiment is attached to the attachment portion 226 of the pressure receiving mat 225 by sliding in the seat width direction.

The side portion of the push switch 240 is provided with the fixing claw 246 which protrudes outward and the push switch 240 can be fixed to the pressure receiving mat 225 by inserting the fixing claw below the engagement piece 227 provided in the attachment portion 226.

As shown in FIGS. 25A and 25B, in the push switch 240, the taper 246a is formed at the end of the fixing claw 246 which comes into contact with the engagement piece 227 of the attachment portion 226 at the time of attachment to the attachment portion 226. Further, the taper 227a is also formed at the end of the engagement piece 227. Since the tapers 227a and 246a are formed at the facing ends, the engagement piece 227 is bent and the fixing claw 246 can be easily inserted below the engagement piece 227 when the push switch 240 is slid toward the attachment portion 226.

<Insertion Guide 245>

The push switch 240 is provided with an insertion guide 245 which guides the insertion direction (the direction of the arrow of FIG. 25) at the time of attachment to the attachment portion 226. The insertion guide 245 is configured as a plurality of ribs (protrusions) formed on the lower surface of the casing body 242 of the push switch 240 and extending in the insertion direction.

Figure 26:
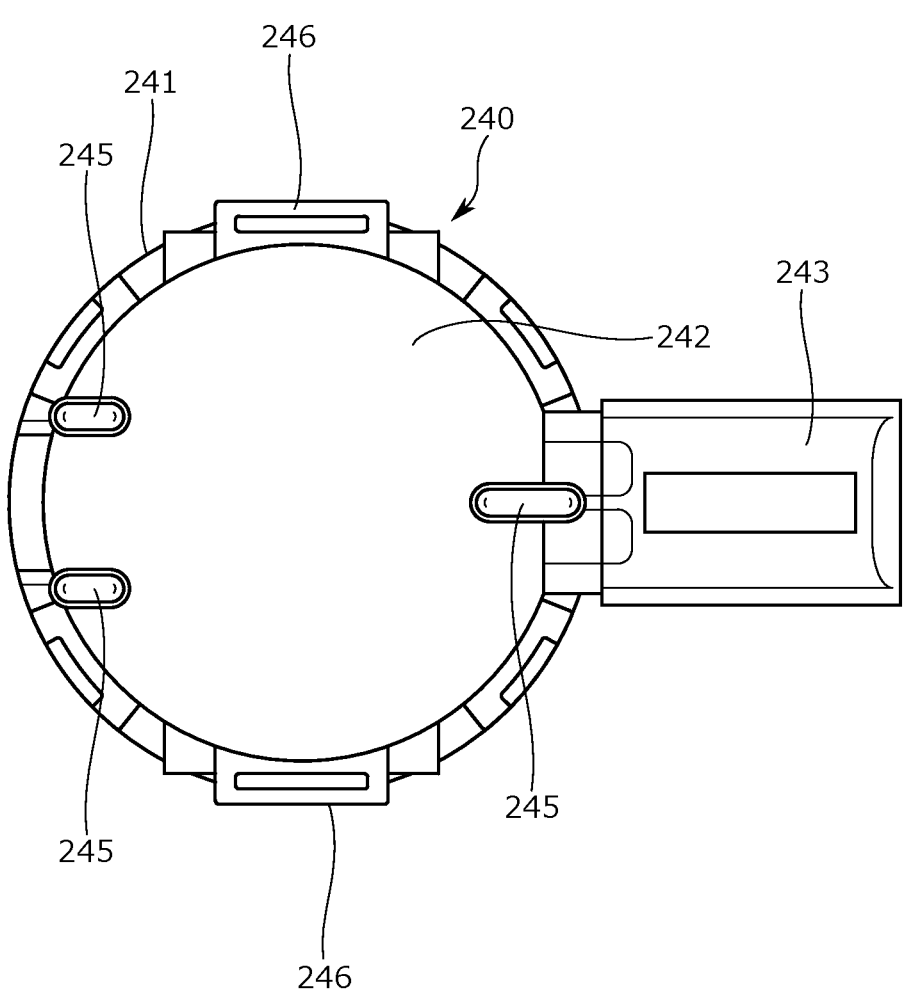
FIG. 26 is a bottom view of the push switch.

In the push switch 240 of this embodiment, the insertion guide 245 is provided in the periphery of the casing body 242 away from the center portion. Then, as shown in FIG. 26, two insertion guides are provided between the end of the casing body 242 which becomes a leading part at the time of insertion and the end of the fixing claw 246. Further, the insertion guide 245 which is different from two insertion guides 245 is provided to be located at the center of the push switch 240 in the width direction at the end provided with the connector 243.

Furthermore, a groove 228 (see FIG. 20) is formed at a position corresponding to the insertion guide 245 in the attachment portion 226 of the pressure receiving mat 225 and the sliding of the push switch 240 is guided when the insertion guide 245 is inserted into the groove 228. Further, the insertion guide 245 also functions as a rotation stopper rib that prevents the push switch 240 from rotating after attachment.

Further, in this embodiment, three insertion guides 245 are provided on the lower surface of the push switch 240, but four or more insertion guides 245 may be provided. Further, the insertion guide 245 may be provided at one position or two positions.

The third embodiment of the present invention has been described above with reference to the drawings. The present invention is not limited to the above-described embodiments or modified examples and can be modified as appropriate without departing from the spirit of the present invention.

The second embodiment and the third embodiment described above will be additionally described below.

Second Embodiment (Supplementary Note 1)

A conveyance seat including:

a seat body which includes a seat cushion and a seat back connected to a rear end of the seat cushion to be folded forward; and a hinge mechanism which is provided at a front end of the seat cushion to change the seat back from a forward folded state of folding the seat back forward to an upright state of folding the seat back upright by flipping up the seat body forward against a floor, in which the hinge mechanism includes a hinge shaft which extends in a seat width direction, a shaft support member which supports the hinge shaft, a fixed member that is joined to the shaft support member and fixes the hinge mechanism to the floor, and a biasing member that is provided around the hinge shaft and biases the seat body, in which the biasing member includes an engagement portion which engages with the fixed member or the shaft support member in accordance with the seat body state, in which the fixed member includes a first contact portion which comes into contact with the engagement portion of the biasing member to stop the movement of the engagement portion when the seat body is flipped up into the upright state, and in which the first contact portion is integrally provided in the fixed member so that the fixed member and the first contact portion are formed as a single component.

(Supplementary Note 2)

The conveyance seat according to Supplementary Note 1, in which the first contact portion is formed by cutting and raising a part of the fixed member.

(Supplementary Note 3)

The conveyance seat according to Supplementary Note 1 or 2, in which the engagement portion extends from the end of the biasing member in the seat width direction, and in which the length of the first contact portion in the seat width direction is shorter than the length of the engagement portion of the biasing member in the seat width direction.

(Supplementary Note 4)

The conveyance seat according to any one of Supplementary Notes 1 to 3, in which the shaft support member includes a second contact portion which comes into contact with the engagement portion of the biasing member to stop the movement of the engagement portion when the seat body changes from the upright state to the forward folded state, and in which the second contact portion is integrally provided in the shaft support member, and the shaft support member and the second contact portion are formed as a single component.

(Supplementary Note 5)

The conveyance seat according to Supplementary Note 4, in which the shaft support member includes a pair of bearing portions which are arranged to face each other in the seat width direction and support the hinge shaft and a front wall portion which connects the pair of bearing portions, and in which the second contact portion is formed in a convex shape that protrudes from the front wall portion of the shaft support member toward the biasing member.

(Supplementary Note 6)

The conveyance seat according to Supplementary Note 4 or 5, in which a plurality of the second contact portions are provided in the shaft support member and the length of each of the plurality of second contact portions in the seat width direction is formed to be smaller than the length of the first contact portion in the seat width direction, and in which the plurality of second contact portions are arranged to avoid the center portion of the shaft support member in the seat width direction.

(Supplementary Note 7)

The conveyance seat according to Supplementary Note 6, in which a through-hole is formed between the plurality of second contact portions.

(Supplementary Note 8)

The conveyance seat according to Supplementary Note 6 or 7, in which the first contact portion is disposed in the fixed member to be located between the plurality of second contact portions arranged at intervals in the seat width direction when viewed from the front and the first contact portion is disposed not to overlap the second contact portion in the front to rear direction.

(Supplementary Note 9)

The conveyance seat according to any one of Supplementary Notes 6 to 8, in which the plurality of second contact portions are arranged so that an arrangement interval in the seat width direction is larger than the length of the first contact portion in the seat width direction.

(Supplementary Note 10)

The conveyance seat according to any one of Supplementary Notes 1 to 9, in which a reinforcement portion is provided in the fixed member at a position overlapping the first contact portion in the front to rear direction.

Third Embodiment (Supplementary Note 11)

A conveyance seat on which an occupant is seated, including:

a cushion pad which supports the buttocks of the occupant when the occupant is seated;

a pressure receiving mat which is disposed below the cushion pad; and a pressure sensor which is attached to the pressure receiving mat, in which the pressure sensor is configured as a push switch and is disposed at a position in which a lower surface of the cushion pad presses down an upper end of the push switch in a pressure contact state in the pressure receiving mat, and in which the push switch is attached to the pressure receiving mat so that the upper end of the push switch is located above an upper surface of the pressure receiving mat around the push switch or located at the same height as the upper surface when the push switch is turned on by being pressed down from the lower surface of the cushion pad.

(Supplementary Note 12)

A conveyance seat on which an occupant is seated, including:

a cushion pad which supports the buttocks of the occupant when the occupant is seated;

a pressure receiving mat which is disposed below the cushion pad; and a pressure sensor which is attached to the pressure receiving mat, in which a ventilation groove through which air blown from a blowing device passes is formed inside the cushion pad, in which the pressure sensor is configured as a push switch and is disposed at a position in which a lower surface of the cushion pad presses down an upper end of the push switch in a pressure contact state in the pressure receiving mat, and in which the push switch is disposed at a position avoiding the ventilation groove when viewed from above the cushion pad.

(Supplementary Note 13)

The conveyance seat according to Supplementary Note 12, in which the cushion pad includes a first pad material and a second pad material disposed on a seating surface side of the first pad material in an overlapping state,

in which the ventilation groove is formed between the first
pad material and the second pad material in the second
pad material, and
in which the push switch is disposed at a position avoiding
the ventilation groove when viewed from above the
cushion pad.
(Supplementary Note 14)
The conveyance seat according to Supplementary Note
13,
in which the first pad material is provided with a ventilation hole which penetrates the first pad material in an
up to down direction and communicates with the ven-
tilation groove, and
in which the push switch is disposed at a position avoiding
the ventilation hole when viewed from above the
cushion pad.
(Supplementary Note 15)
A conveyance seat on which an occupant is seated,
including:
a cushion pad which supports the buttocks of the occupant when the occupant is seated;
a skin material which covers the cushion pad;
a pressure receiving mat which is disposed below the
cushion pad; and
a pressure sensor which is attached to the pressure receiving mat,
in which the pressure sensor is configured as a push
switch and is disposed at a position in which a lower
surface of the cushion pad presses down an upper end
of the push switch in a pressure contact state in the
pressure receiving mat,
in which a hanging member for hanging the skin material
onto the cushion pad is attached to the skin material at
a hanging position of hanging the skin material onto the
cushion pad,
in which an engagement member which engages with the
hanging member is attached to the cushion pad, and
in which the push switch is disposed at a position avoiding
the hanging member and the engagement member
when viewed from above the cushion pad.

REFERENCE SIGNS LIST

<First embodiment>

| | |
|---|---|
| S: | conveyance seat (vehicle seat) |
| 1: | seat cushion |
| 1a: | skin material |
| 2: | seat back |
| 2a: | pad material |
| 2b: | skin material |
| 3: | headrest |
| 10: | pad material |
| 11: | first pad material |
| 11a: | first skin hanging groove |
| 11b: | second skin hanging groove |
| 11c: | attachment portion (attachment concave portion) |
| 11d: | opening portion |
| 12: | second pad material |
| 12a: | sensor accommodation concave portion (sensor accommodation portion) |
| 12b: | attached portion (attachment convex portion) |
| 12c: | anchor passage portion |
| 13: | wire member |
| 13a: | wire body portion |
| 13b: | wire assembly portion |
| 20: | accommodation groove |
| 21: | groove body portion |
| 21a: | side portion (front side portion) |
| 21b: | side portion (rear side portion) |
| 22: | groove extension portion |

38

-continued

REFERENCE SIGNS LIST

| | |
|---|---|
| 30: | latching portion |
| 31: | protrusion portion |
| 32: | concave portion |
| 33: | through-hole |
| 40: | detection sensor (seating sensor) |
| 41: | sensor detection unit |
| 42: | transmission path |
| 50: | connecting member |
| 51: | body portion |
| 52: | extension portion |
| 53: | coupler |
| 60: | control device (ECU) |
| 61: | communication unit |
| 62: | control unit |
| 70: | power source |

<Second embodiment>

| | |
|---|---|
| SA: | vehicle seat |
| SAh: | seat body |
| T: | trim cover |
| P: | pad |
| FL: | vehicle floor (floor) |
| 101: | seat cushion |
| 102: | seat back |
| 103: | headrest |
| 105: | reclining mechanism |
| 110: | cushion frame |
| 111: | side frame |
| 112: | front connection pipe |
| 113: | rear connection pipe |
| 114: | wire |
| 120: | slide rail |
| 121: | upper rail |
| 122: | lower rail |
| 125: | lock mechanism |
| 126: | hook |
| 127: | striker |
| 130: | hinge mechanism |
| 131: | fixed bracket (fixed member) |
| 131a: | base portion |
| 131b: | front leg portion |
| 131c: | rear leg portion |
| 131d: | flange |
| 131e: | first contact portion |
| 131f: | through-hole |
| 131g: | bead (reinforcement portion) |
| 131h: | bolt hole |
| 131i: | bolt hole |
| 132: | shaft support member |
| 132a: | bearing portion |
| 132b: | bearing hole |
| 132c: | front wall portion |
| 132d: | second contact portion |
| 132e: | through-hole |
| 132f: | lower end |
| 133: | hinge shaft |
| 134: | spacer |
| 135: | coil spring (biasing member) |
| 135a: | spring body |
| 135b: | engagement portion |
| 135c: | rail support portion |
| 136: | welding mark |

<Third embodiment>

| | |
|---|---|
| SB: | conveyance seat |
| SBh: | seat body |
| FB: | seat frame |
| TB: | skin material |
| 201: | seat back |
| 202: | seat cushion |
| 203: | headrest |
| 205: | reclining device |
| 205a: | reclining device cover |
| 210: | seat back frame |
| 211: | backside frame |
| 212: | upper frame |
| 213: | lower frame |

39

-continued

REFERENCE SIGNS LIST

| | |
|---|---|
| 214: | connection frame |
| 215: | wire member |
| 216: | pressure receiving member |
| 217: | pillar support portion |
| 218: | seat back pad |
| 220: | seat cushion frame |
| 221: | cushion side frame |
| 222: | pan frame |
| 223: | front connection frame |
| 224: | rear connection frame |
| 225: | pressure receiving mat |
| 225a: | upper surface |
| 226: | attachment portion |
| 227: | engagement piece |
| 227a: | taper |
| 228: | groove |
| 230: | headrest frame |
| 231: | headrest stay |
| 232: | hanging member |
| 233: | locking portion |
| 240: | push switch (pressure sensor) |
| 240a: | upper end |
| 241: | cover |
| 242: | casing body |
| 243: | connector |
| 244: | harness |
| 245: | insertion guide |
| 246: | fixing claw |
| 246a: | taper |
| 250: | cushion pad |
| 251: | first pad material |
| 252: | second pad material |
| 252a: | lower member |
| 252b: | upper member |
| 253: | ventilation groove |
| 254: | ventilation hole |
| 255: | blowing port |
| 256: | hanging groove |
| 257: | engagement member |
| 270: | rail device |
| 271: | lower rail |
| 272: | upper rail |
| 280: | blowing device |
| 281: | blower |
| 282: | duct |
| 283: | blowout portion |

The invention claimed is:

1. A conveyance seat provided with a pad material, comprising: a connecting member that is provided inside the conveyance seat to connect electrical devices, wherein the pad material includes a first pad material and a second pad material which is provided on a back surface side of the first pad material and is disposed to overlap the first pad material, wherein a front or back surface of at least one pad material of the first pad material and the second pad material is provided with an accommodation groove provided to be recessed in a thickness direction of the pad material and accommodating the connecting member, and wherein the accommodation groove extends to be long along the surface of the at least one pad material and includes a latching portion provided at a predetermined position of the accommodation groove in an extension direction, protrudes from one side portion toward the other side portion of the accommodation groove, and latches the connecting member in order to accommodate the connecting member, and wherein a part of a bottom surface of the accommodation groove is provided with a concave portion which is recessed in the thickness direction of the pad material or a through-hole which penetrates in the thickness direction of the pad material, and wherein the latching portion is provided at a position corresponding to the concave portion or the through-hole in the extension direction of the accommodation groove and latches the connecting member to be covered.

2. The conveyance seat according to claim 1, wherein the concave portion or the through-hole is formed to project from the accommodation groove toward the other side portion side of the accommodation groove, wherein a portion formed on the bottom surface of the accommodation groove in the concave portion or the through-hole is positioned to face the latching portion, and wherein a portion that projects from the accommodation groove in the concave portion or the through-hole is positioned not to face the latching portion.

3. The conveyance seat according to claim 1, wherein a portion formed on the bottom surface of the accommodation groove in the concave portion or the through-hole extends to the outer positions of both ends of the latching portion in the extension direction of the accommodation groove.

4. The conveyance seat according to claim 1, wherein the second pad material is formed to be harder than the first pad material, and wherein the accommodation groove is formed on the front surface of the second pad material and is provided to face the back surface of the first pad material.

5. The conveyance seat according to claim 4, further comprising: a detection sensor which detects biological signals of a seated person, wherein the front surface of the second pad material is provided with the accommodation groove and a sensor accommodation portion for accommodating the detection sensor, wherein one end of the connecting member is connected to the detection sensor, and wherein the other end of the connecting member is exposed from the second pad material and is connected to the electrical device side.

6. The conveyance seat according to claim 5, wherein the accommodation groove and the sensor accommodation portion are continuously formed on the front surface of the second pad material, wherein a plurality of the sensor accommodation portions are formed at intervals in a seat width direction, wherein the accommodation groove includes a groove body portion which extends to be long in the seat width direction and a plurality of groove extension portions which are formed at intervals in the seat width direction and respectively extend in a front to rear direction of the seat to connect the groove body portion and the sensor accommodation portion, and wherein a plurality of the latching portions are formed at intervals in the seat width direction and are arranged between the plurality of sensor accommodation portions in the seat width direction.

7. The conveyance seat according to claim 6, wherein the groove body portion extends to one end of the second pad material in the seat width direction, and wherein the other end of the connecting member is exposed from the one end of the second pad material and is connected to the electrical device side.

8. The conveyance seat according to claim 4, further comprising: a wire member that holds the second pad material, wherein the second pad material is made of foamed resin and is formed by insert-molding the wire member.

9. The conveyance seat according to claim 8, wherein the second pad material is made of foamed polypropylene, and wherein the first pad material is made of urethane foam and is disposed on the second pad material.

\* \* \* \* \*